United States Patent
Kondoh et al.

(10) Patent No.: US 9,395,483 B2
(45) Date of Patent: Jul. 19, 2016

(54) ILLUMINATION DEVICE, DISPLAY DEVICE, AND TELEVISION RECEPTION DEVICE

(71) Applicant: Sharp Kabushiki Kaisha, Osaka (JP)

(72) Inventors: Kazuya Kondoh, Osaka (JP); Tsuyoshi Ozeki, Osaka (JP); Mamoru Ohashi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/422,325

(22) PCT Filed: Aug. 14, 2013

(86) PCT No.: PCT/JP2013/071905
§ 371 (c)(1),
(2) Date: Feb. 18, 2015

(87) PCT Pub. No.: WO2014/030582
PCT Pub. Date: Feb. 27, 2014

(65) Prior Publication Data
US 2015/0205038 A1    Jul. 23, 2015

(30) Foreign Application Priority Data
Aug. 23, 2012  (JP) .................................. 2012-184458

(51) Int. Cl.
*F21V 8/00*     (2006.01)
*H04N 5/44*     (2011.01)
*G02F 1/1335*   (2006.01)

(52) U.S. Cl.
CPC ............ *G02B 6/0088* (2013.01); *G02B 6/0083* (2013.01); *G02B 6/0085* (2013.01); *G02F 1/133603* (2013.01); *G02F 1/133608* (2013.01); *H04N 5/44* (2013.01); *G02B 6/0055* (2013.01); *G02B 6/0068* (2013.01)

(58) Field of Classification Search
CPC ................ G02B 6/0085; G02B 6/0088; G02F 1/133603; G02F 1/133608
USPC .................................................. 362/632–634
See application file for complete search history.

(56) References Cited

U.S. PATENT DOCUMENTS

| 8,382,359 B2 * | 2/2013 | Shimizu | ............... | G02B 6/0046 362/609 |
| 8,749,730 B2 * | 6/2014 | Zhang | .................. | G02B 6/0088 349/61 |

(Continued)

FOREIGN PATENT DOCUMENTS

JP    2008-21421 A    1/2008
JP    2012-109207 A   6/2012

*Primary Examiner* — Anabel Ton
(74) *Attorney, Agent, or Firm* — Chen Yoshimura LLP

(57) ABSTRACT

A backlight device is provided with the following: LEDs; a light guide plate formed in a rectangular plate shape and having at the end surfaces thereof a light-receiving face opposing the LEDs and a reflection surface disposed on the side opposite the light-receiving face, and having on the plate surface thereof a light-emitting surface that emits light; a portion to be supported provided to the corner part, from among the corner parts of the light guide plate, that is disposed on the opposite surface side; a supporting portion that supports the light guide plate in a first direction and a second direction by coming into contact with the portion to be supported, when the first direction is a direction in which the LEDs and the light guide plate are lined up, and the second direction is a direction that is orthogonal to the first direction and that follows along the light-emitting surface of the light guide plate; and a inclined portion that is provided to the portion to be supported and that forms a slanted shape with respect to both the first direction and the second direction, and by facing outward in the second direction is distanced from the LEDs in the first direction.

13 Claims, 18 Drawing Sheets

(56) References Cited

U.S. PATENT DOCUMENTS

| | | | | |
|---|---|---|---|---|
| 8,902,377 B2* | 12/2014 | Yu | ................... | G02F 1/133308 349/58 |
| 2008/0007956 A1 | 1/2008 | Ohno et al. | | |
| 2011/0235366 A1* | 9/2011 | Hisada | .............. | G02F 1/133608 362/633 |
| 2012/0092890 A1 | 4/2012 | Matsui | | |
| 2013/0265524 A1* | 10/2013 | Chang | ................. | G02B 6/0088 349/65 |

* cited by examiner

ILLUMINATION DEVICE, DISPLAY DEVICE, AND TELEVISION RECEPTION DEVICE

TECHNICAL FIELD

The present invention relates to an illumination device, a display device, and a television receiver.

BACKGROUND ART

In recent years, flat panel display devices that use flat panel display elements such as liquid crystal panels and plasma display panels are increasingly used as display elements for image display devices such as television receivers instead of conventional cathode-ray tube displays, allowing image display devices to be made thinner. In the liquid crystal display device, a liquid crystal panel used therein does not emit light, and therefore, it is necessary to separately provide a backlight device as an illumination device. Backlight devices are largely categorized into a direct-lighting type and an edge-lighting type depending on the mechanism thereof. In order to make the liquid crystal display device even thinner, it is preferable to use an edge-lighting type backlight device, and a known example thereof is disclosed in Patent Document 1 below.

RELATED ART DOCUMENT

Patent Document

Patent Document 1: Japanese Patent Application Laid-Open Publication No. 2008-21421

PROBLEMS TO BE SOLVED BY THE INVENTION

Patent Document 1 discloses that by bonding the light guide plate to a bonding part provided on an inner frame member, the light guide plate is held by the inner frame member and a certain gap is formed between the light-emitting surface of point light sources and a light-receiving face of the light guide plate. However, the bonding part mentioned above cannot suppress the light guide plate from moving toward the light-emitting surface of the point light sources or away if the light guide plate thermally expands or thermally contracts, and there is a risk that the point light sources will be damaged by the light guide plate or that the incidence efficiency of light from the light source to the light guide plate decreases.

SUMMARY OF THE INVENTION

The present invention was completed in view of the above-mentioned situation, and an object thereof is to resolve the problem caused by the expansion and contraction of the light guide plate.

MEANS FOR SOLVING THE PROBLEMS

The illumination device of the present invention includes a light source; a light guide plate having a rectangular shape including a light-receiving side face facing the light source, the light guide plate further having a surface that is a light-emitting surface that emits light and a portion to be supported that is provided at a corner area of the light guide plate on a side of the light guide plate opposite the light-receiving side face; and a supporting member that supports the light guide plate in a first direction and a second direction by abutting the light guide plate at the portion to be supported, the second direction being a direction parallel to the light-receiving side face of the light guide plate, the first direction being a direction perpendicular to the second direction in a plan view, wherein at least one of the portion to be supported and the supporting member has a structure extending in a direction that is angled relative to the first direction and the second direction, the structure extending generally outwardly relative to a center of the light guide plate.

As a result, the light from the light source is emitted from the light-emitting surface after the light enters the light-receiving face of the light guide plate and travels through the light guide plate. If the temperature inside the illumination device increases due to the light source turning ON, then the light guide plate thermally expands respectively in the first direction and the second direction. However, there is concern that the light-receiving face shifts closer to the light source in the first direction. The light guide plate is supported in the first direction and the second direction by having the supporting member come into contact with the portion to be supported. Thus, if the light guide plate expands thermally, then the portion to be supported shifts in the first direction and the second direction.

At least one of the portion to be supported and the supporting member has an inclined portion that is inclined to both the first direction and the second direction such that being farther outside in the second direction leads to being farther away from the light source. Therefore, the portion to be supported shifts relatively outward in the second direction to the supporting member and relatively away from the light source in the first direction by being guided by the inclined portion as the light guide plate thermally expands. Meanwhile, the light-receiving face of the light guide plate shifts in a similar manner to the portion to be supported. As a result, the distance between the light source and the light-receiving face is less likely to change because the amount in which the light source shifts towards the light-receiving face by the light guide plate expanding in the first direction due to thermal expansion is cancelled out by the amount in which the portion to be supported is guided by the inclined portion such that the portion to be supported shifts away from the light source.

On the other hand, if the temperature in the illumination device decreases, then the light guide plate thermally contracts, and therefore contracts in the first direction and the second direction. In this case, the portion to be supported is guided by the inclined portion along with the thermal contraction of the light guide plate and shifts relatively inward in the second direction and shifts toward the light source in the first direction. As a result, the distance between the light source and the light-receiving face is less likely to change because the amount the light-receiving face shifts away from the light source due to the light guide plate contracting in the first direction through thermal contraction is cancelled out by the amount the light-receiving face shifts towards the light source in the first direction by being guided by the inclined portion of the portion to be supported.

The problem caused by the light guide plate expanding and contracting, more specifically, the problem in which the distance between the light source and the light-receiving face changes can be resolved by a simple structure having a portion to be supported for supporting the light guide plate and an inclined portion provided on at least one of the portion to be supported and the supporting member. As a result, the incidence efficiency of light entering the light-receiving face becomes stable and the light emitted from the light guide plate becomes less likely to have uneven brightness, and the light-receiving face can be prevented from interfering with the light source.

Furthermore, the portion to be supported is provided in the corner portion of the opposite face side that is disposed to the side opposite the light-receiving face of the corner portion of the light guide plate formed in a rectangular plate shape, and therefore light entering the light-receiving face of the light guide plate from the light source is unlikely to be blocked by the portion to be supported while being transmitted through the light guide plate. Along with the narrowing of the frame of the backlight device, if the light guide plate is made smaller in the second direction, then the portion to be supported is disposed closer to the light source in the second direction and there is a concern that the portion to be supported will block light. On the other hand, by having the portion to be supported provided on a corner portion of the light guide plate disposed on a corner portion of an opposite face side, the portion to be supported is less likely to block light, and therefore preferable for narrowing the frame of the illumination device.

As embodiments of the present invention, the following configurations are preferred.

(1) This method is more suitable for narrowing the frame of the illumination device when compared to a case in which the portion to be supported is formed by indenting a portion of a side face of the light guide plate. If a portion of the edge face of the light guide plate is formed by indenting an edge face of the portion to be supported of the light guide plate, then there is a risk of the portion to be supported blocking the light transmitted in the light guide plate, but by providing the portion to be supported on a corner portion of the light guide plate on an opposite face side, the portion to be supported is less likely to block light.

(2) The portion to be supported is provided in a position that overlaps the light source in the second direction. There is a risk that the portion to be supported will block light transmitted in the light guide plate, but by providing the portion to be supported on a corner portion of the opposite face side, the portion to be supported is less likely to block light. As a result, this is more suitable for narrowing the frame of the illumination device.

(3) The illumination device further includes a light source substrate formed in a plate shape extending along the second direction having a power supply member for supplying power on an end portion in the second direction, wherein the power supply member does not overlap the light guide plate in the second direction. In this case, an edge portion of the light guide plate in the second direction is disposed further inside than the power supply member, and thus compared to a case in which the edge portion is disposed in a position overlapping the power source portion in the second direction, the light guide plate is smaller in the second direction and the frame of the illumination device can be made narrower.

(4) The inclined portion is formed of an inclined face that is linear. In this case, by setting the inclination angle of the inclined face relative to the first direction and the second direction depending on conditions such as the position of the portion to be supported of the light guide plate, the amount the portion to be supported shifts in the first direction due to the thermal expansion or the thermal contraction of the light guide plate can be defined. Therefore, the design and production is simpler and the cost is better compared to if the inclined portion is formed of a curved face.

(5) The portion to be supported, the supporting member, and the inclined portion are provided on each of opposing sides of the light guide plate that are opposing each other in the second direction. In this manner, the light guide plate is stably supported from both sides in the second direction by respective pairs of the portions to be supported and the supporting member. Furthermore, if the light guide plate thermally expands or thermally contracts, then the pair of portion to be supported disposed on both edges in the second direction are respectively guided by the pair of inclined portions and thus respectively shift outward or inward in the second direction.

(6) When the illumination device is placed such that the first direction substantially matches a vertical direction and the second direction substantially matches a horizontal direction, the supporting member and the portion to be supported of the light guide plate are configured such that the supporting member supports the light guide plate from below. In this case, the portion to be supported of the light guide plate is supported from the bottom side in the vertical direction by the supporting member, and the portion to be supported and the supporting member can be kept in contact with each other due to the weight of the light guide plate and be stably supported. Even if thermal expansion or thermal contraction of the light guide plate takes place, the inclined portion guides the portion to be supported appropriately because the portion to be supported shifts while being in contact with the supporting member due to the weight of the light guide plate. Thus, the guiding function of the light guide plate can be sufficiently exhibited by the inclined portion, and therefore the problems caused by the expansion and contraction of the light guide plate can be reliably resolved.

(7) At least the portion to be supported of the light guide plate has the inclined portion. In this case, the portion to be supported is a portion of the light guide plate, and thus an inclined portion can be easily provided on the portion to be supported.

(8) The illumination device further includes a chassis that houses the light source and the light guide plate, the chassis having a bottom plate disposed behind the light guide plate on a rear side of the illumination device, wherein the supporting member is provided by raising a portion of the bottom plate towards a front side of the illumination device. As a result, the supporting member can support the light guide plate at a more appropriate position relative to the light source because the supporting member is provided by raising the bottom plate of the chassis that houses the light source toward the light guide plate side.

(9) The portion to be supported is provided by forming a protrusion on a portion of a side face of the light guide plate. As a result, the portion to be supported is less likely to block the light transmitted in the light guide plate compared to if the portion to be supported is formed by indenting a portion of an edge face of the light guide plate.

(10) The illumination device further includes a light source substrate formed in a plate shape extending along the second direction having a power supply member for supplying power on an end portion in the second direction, wherein the portion to be supported of the light guide plate is disposed so as to overlap the power supply member but not overlap the light source in the second direction. As a result, because the power supply member is provided so as to overlap the portion to be supported in the second direction, the arrangement space of the power supply member in the second direction can be used to provide the portion to be supported. Furthermore, the portion to be supported is provided so as to not overlap the light source in the second direction, and thus the portion to be supported is less likely to block the light transmitted in the light guide plate.

Next, in order to achieve the above-mentioned object, a display device of the present invention includes the above-mentioned illumination device and a display panel that performs display by using light from the illumination device.

With such a display device, the illumination device that supplies light to the display panel is not susceptible to uneven brightness of the emitted light, change in brightness due to temperature change, and damage to the light source. Therefore, it is possible to realize display with excellent display quality.

Examples of the display panel can include a liquid crystal panel. As a liquid crystal display device, such display devices can be used in various applications such as a television or a display of a personal computer, for example, and are particularly suitable for large screens.

EFFECTS OF THE INVENTION

According to the present invention, problems caused by the expansion and contraction of the light guide plate can be resolved.

DETAILED DESCRIPTION OF EMBODIMENTS

Embodiment 1

Figure 2:
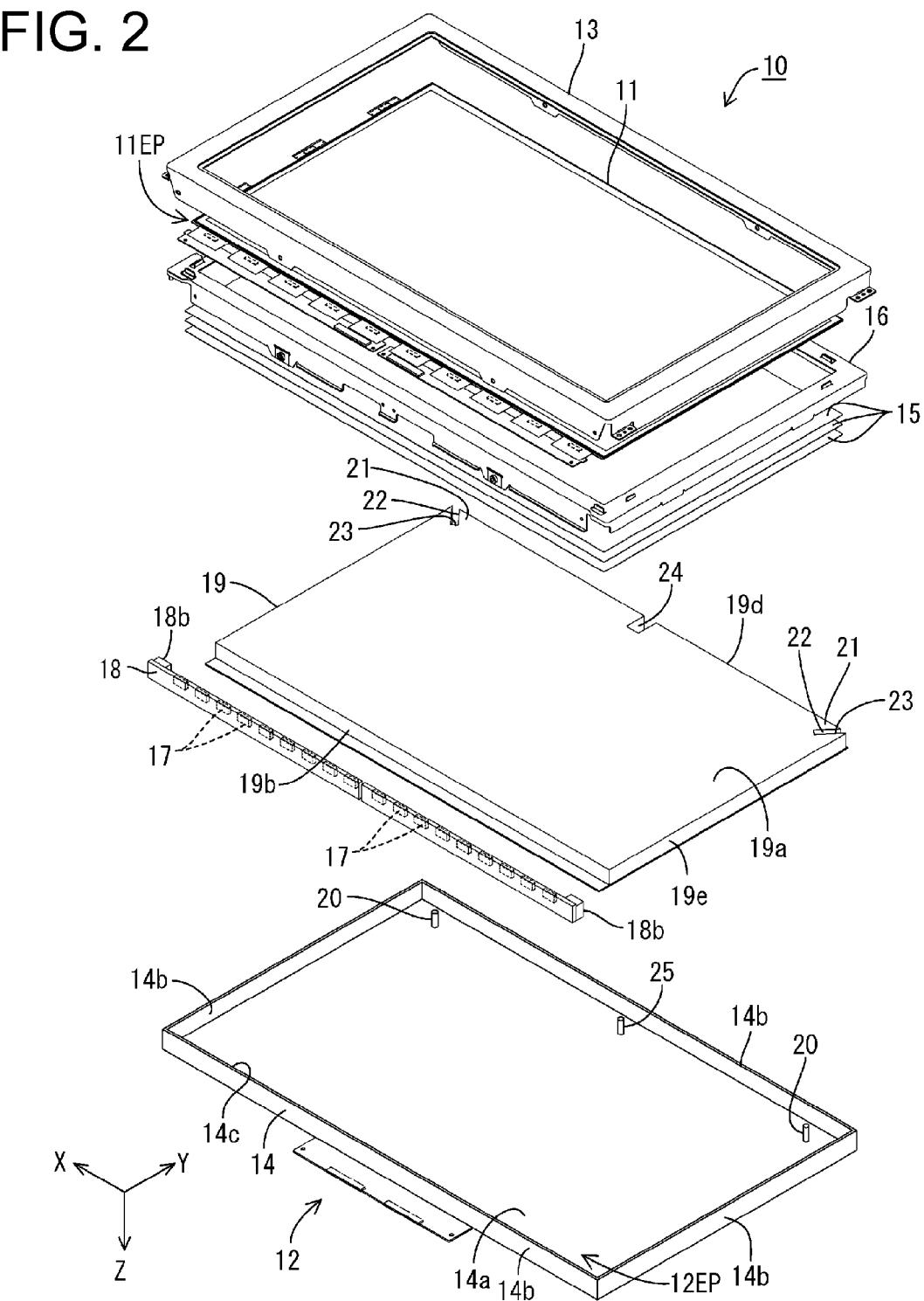
FIG. 2 is an exploded perspective view showing a schematic configuration of a liquid crystal display device.
Figure 3:
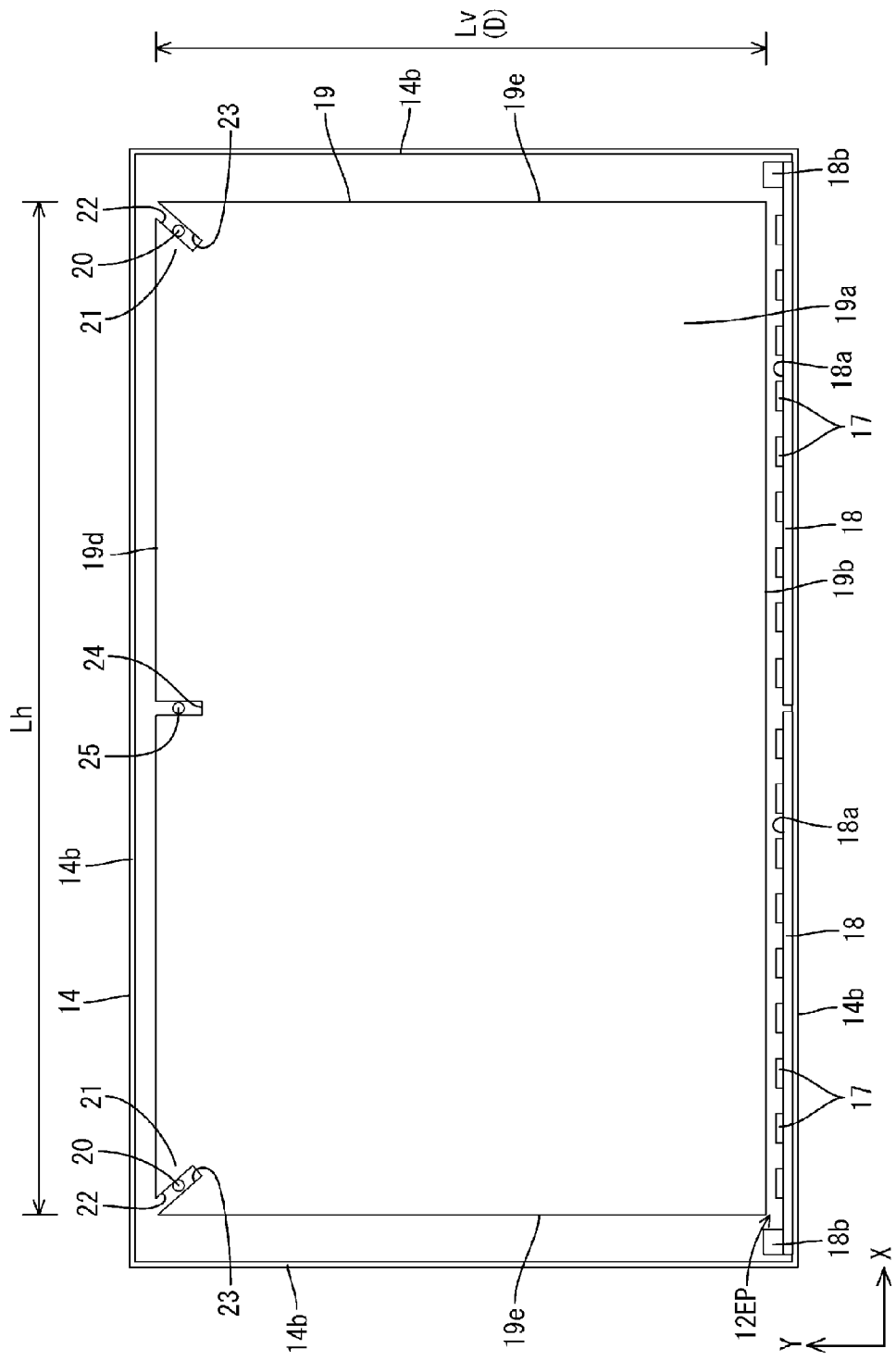
FIG. 3 is a plan view showing an arrangement configuration of a chassis, light guide plate, and LED substrate in a backlight device provided in the liquid crystal display device.
Figure 4:
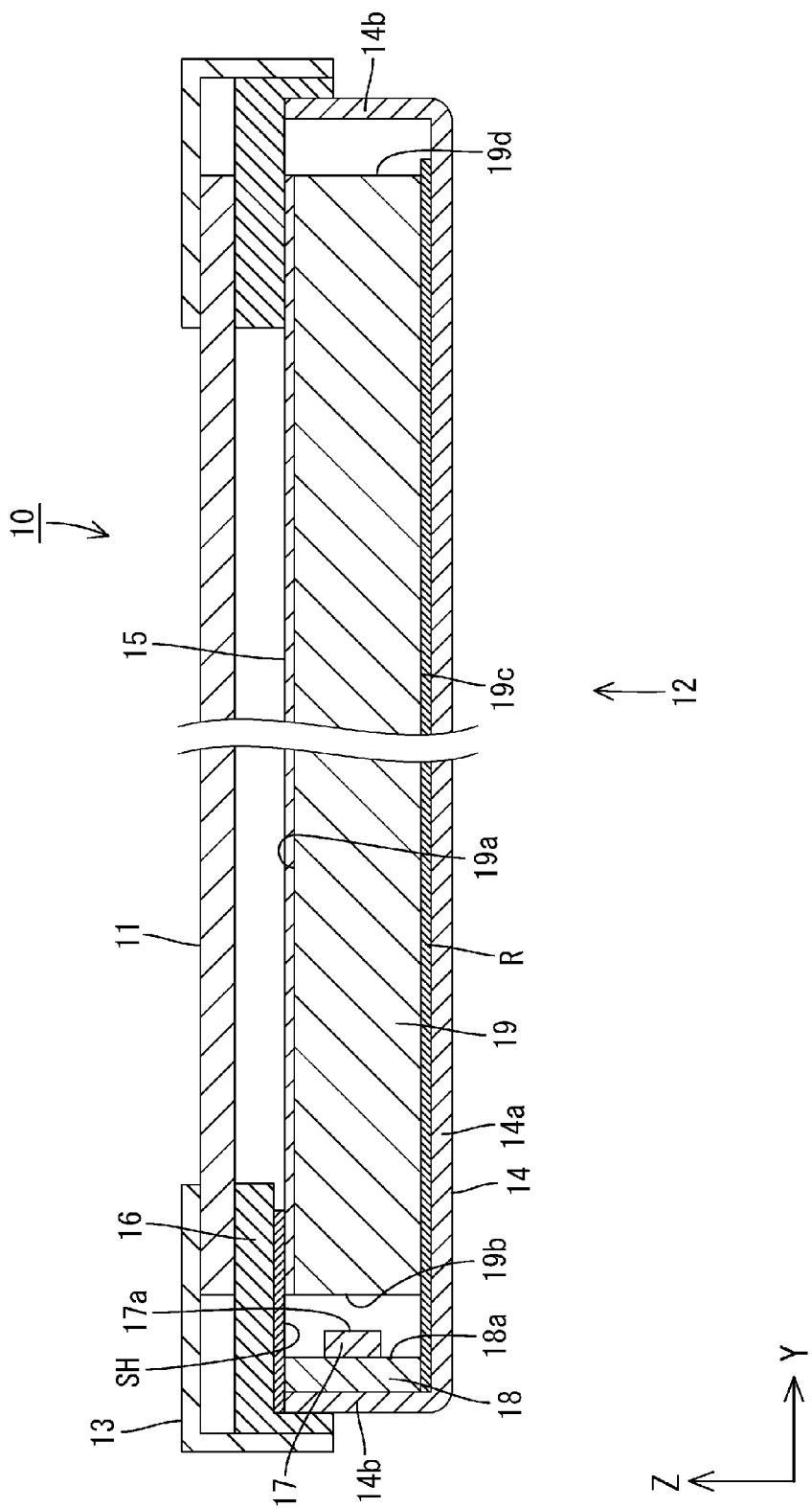
FIG. 4 is a cross-sectional view that shows a cross-sectional configuration of the liquid crystal display device along the shorter side direction.

Embodiment 1 of the present invention will be described with reference to FIGS. 1 to 7. In the present embodiment, a liquid crystal display device 10 will be described as an example. The drawings indicate an X axis, a Y axis, and a Z axis in a portion of the drawings, and each of the axes indicates the same direction for the respective drawings. The Y axis direction substantially corresponds to the vertical direction and the X axis direction substantially corresponds to the horizontal direction. Unless otherwise noted, "up" and "down" in the description is based on the vertical direction (FIG. 3). In addition, the top side in FIG. 4 is referred to as the front side and the bottom side of the same figure is referred to as the rear side. Also, the left side of the same figure is referred to as the bottom side in the vertical direction and the right side of the same figure is referred to as the top side in the vertical direction.

Figure 1:
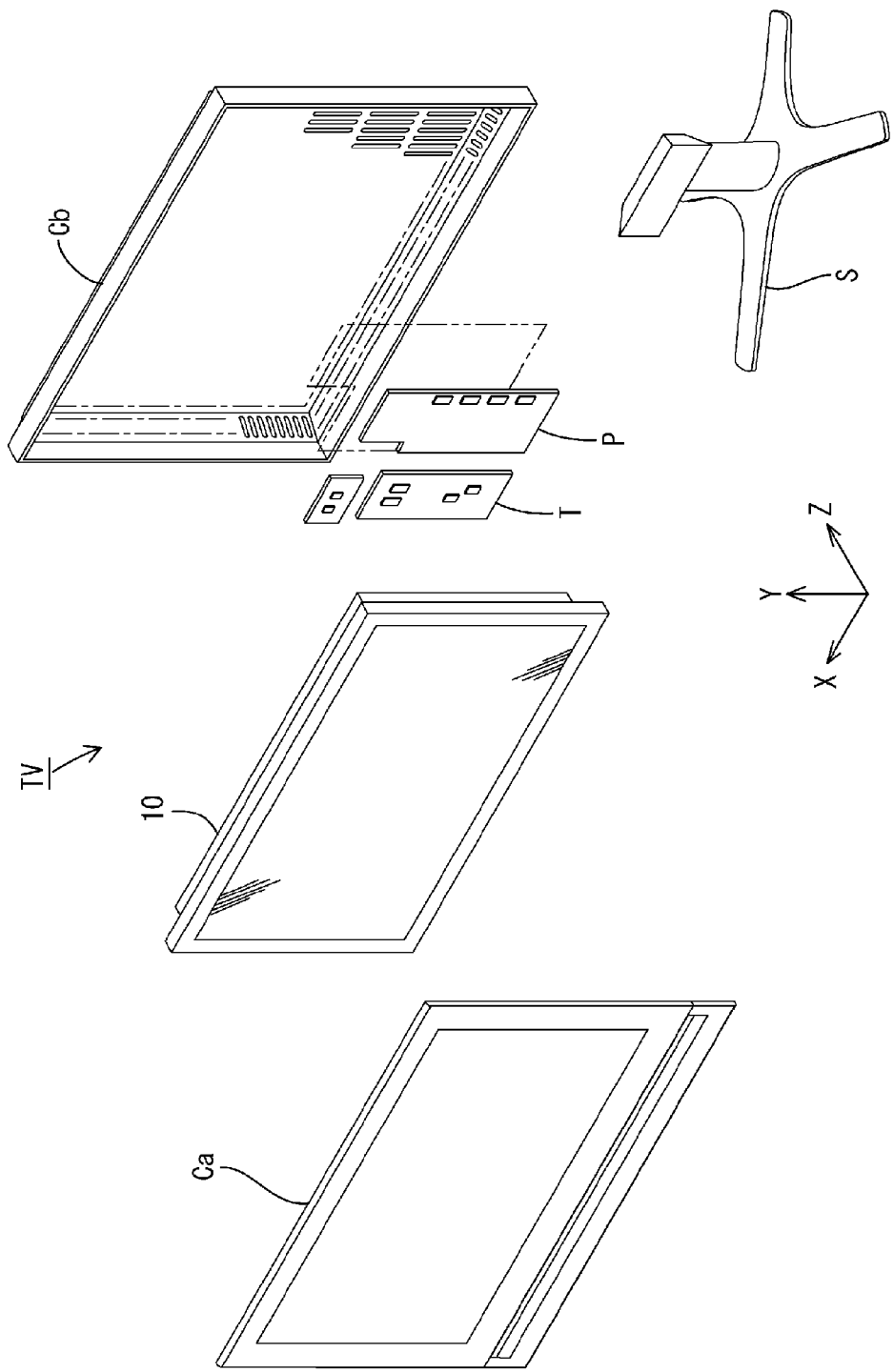
FIG. 1 is an exploded perspective view of a schematic configuration of a television receiver according to Embodiment 1 of the present invention.

As shown in FIG. 1, the television receiver TV related to the present embodiment includes a liquid crystal display device 10, a pair of front and rear cabinets Ca and Cb that sandwiches the liquid crystal display device 10, a power source P, a tuner T, and a stand S. The television receiver TV is supported by the stand S such that the display surface of the liquid crystal display device is oriented along the vertical direction (Y axis direction). The liquid crystal display device (display device) 10 is formed in a horizontally long quadrilateral (rectangular) shape as a whole, and is housed in a vertical orientation. As shown in FIG. 2, the liquid crystal display device 10 includes a liquid crystal panel 11 that is a display panel, and a backlight device (illumination device) 12 that is an external light source, and these are held together by a frame-shaped bezel 13 or the like. "The display surface of the liquid crystal display device 10 is oriented along the vertical direction" in the present embodiment is not limited to a configuration in which the display surface of the liquid crystal display device 10 is parallel to the vertical direction, but also means that the display surface is oriented along a direction that is closer to the vertical direction than the horizontal direction, and includes configurations in which the display surface is inclined to the vertical direction at 0° to 45°, for example, and more preferably, at 0° to 30°.

As shown in FIG. 2, the liquid crystal panel 11 is formed in a horizontally-long quadrilateral shape (rectangular) in a plan view, and is configured by bonding a pair of glass substrates having high light transmittance to each other with a prescribed gap therebetween, and by injecting liquid crystal between the two substrates. On one substrate (array substrate), switching elements (TFTs, for example) respectively connected to mutually intersecting source wiring lines and gate wiring lines, pixel electrodes respectively connected to these switching elements, an alignment film, and the like are provided. Provided on the other substrate (CF substrate) are: color filters having colored parts such as R (red), G (green), and B (blue) being arranged in prescribed arrays; an opposite electrode; an alignment film; and the like. This liquid crystal panel 11 is separated into a display region that is provided toward the center of the screen and that can perform image display, and a non-display region that is in an outer edge of the screen and that is provided in a frame shape surrounding the display region. A pair of front and rear polarizing plates is respectively attached to the outer surfaces of the pair of substrates.

Next, the backlight device 12 will be explained in detail. As shown in FIG. 2, the backlight device 12 includes a substantially box-shaped chassis 14 having a light-emission portion 14c that is open on the front side (liquid crystal panel 11 side), optical members 15 disposed to cover the light-emission portion 14c of the chassis 14, and a frame (pressing member) 16 that presses a light guide plate 19 (described next) from the front. Inside the chassis 14, LED substrates 18 (light source substrates) on which LEDs 17 (light emitting diodes), which are light sources, are mounted, and a light guide plate 19 that guides light from the LEDs 17 toward the optical members 15 (toward the liquid crystal panel 11, direction in which light is emitted) are housed. This backlight device 12 has an LED substrate 18 disposed on one of the two edge portions 12EP in the longer side direction, and each of the LEDs 17 mounted on the LED substrate 18 is disposed toward an edge portion 12EP in the longer side direction of the backlight device 12. Thus, the backlight device 12 of the present embodiment is of a so-called edge-lighting (side lit) type. Specifically, the LEDs 17 and the LED substrate 18 are disposed on the edge portion of the backlight device 12 in the bottom side in the vertical direction (Y axis direction). Each component of the backlight device 12 will be described in detail below.

The chassis 14 is formed of a metal plate such as an aluminum plate or an electro galvanized steel sheet (SECC) having excellent thermal conductivity, and in addition, as shown in FIGS. 2 and 3, the chassis is formed of a bottom plate 14a having a horizontally long rectangular shape similar to that of the liquid crystal panel 11 and a side wall 14b that respectively rises toward the front side from the outer edges of the respective sides (a pair of longer sides and a pair of shorter sides) of the bottom plate 14a. The longer side direction of the chassis 14 (bottom plate 14a) matches the X axis direction (horizontal direction), and the shorter side direction of the chassis 14 matches the Y axis direction (vertical direction). The bezel 13 is fixed to the side wall 14b by a screw or the like while sandwiching the frame 16. In other words, the frame 16 and the bezel 13 are jointly fastened to the chassis 14. These members can be fixed using fixing members other than screws (engaging stoppers erected on a member with another member, for example).

As shown in FIG. 2, the optical members 15 are in a horizontally long rectangular shape in a plan view, as in the liquid crystal panel 11 and the chassis 14. The optical members 15 are disposed on the front side (light-emission side) of the light guide plate 19 between the liquid crystal panel 11 and the light guide plate 19. Therefore, the optical members 15 allow light emitted from the light guide plate 19 to pass through and apply prescribed optical effects on the transmitted light while guiding the light toward the liquid crystal panel 11. The optical members 15 include a plurality (three in the present embodiment) of sheet-shaped members that are stacked one on top of the other. Specific types of optical members 15 (optical sheets) include a diffusion sheet, a lens sheet, a reflective polarizing sheet, and the like, for example, and it is possible to appropriately choose any of these as optical members 15. In FIG. 4, the three optical members 15 are shown as one optical member for ease of depiction.

As shown in FIG. 2, the frame 16 is formed in a frame shape that expands along the outer edges of the light guide plate 19, and can press almost the entire outer edge of the light guide plate 19 from the front side. The frame 16 is made of a synthetic resin, and the frame 16 has light-shielding properties by having the surface thereof colored black, for example. As shown in FIG. 4, a sheet member SH that presses an edge portion of the light guide plate 19 from the front side is attached to the frame 16 on the rear surface of one of a pair of longer side portions that is in the bottom side in the vertical direction, or in other words, on the opposing face that faces the LED substrate 18 (LEDs 17). Interposing this sheet member SH between the frame 16 and an edge portion (having the light-receiving face 19b) of the light guide plate 19 that is facing the LEDs 17 makes it difficult for gaps to form between the frame 16 and the light guide plate 19. As a result, light from the LEDs 17 can be suppressed from leaking from the front side between the frame 16 and the light guide plate 19 having the light-receiving face 19b. The sheet member SH has a size extending along substantially the entire length of the long side portion of the frame 16, abuts the edge portion that faces the LEDs 17 of the light guide plate 19 through an optical member 15, and covers the edge portion of the light guide plate 19 and the LED substrate simultaneously. The frame 16 can receive the outer edges of the liquid crystal panel 11 from the rear side.

As shown in FIGS. 2 and 4, each LED 17 has a configuration in which an LED chip is sealed by a resin material onto a substrate part that is bonded to the LED substrate 18. The LED chip mounted on the substrate part has one type of primary light-emitting wavelength, and specifically, only emits blue light. On the other hand, the resin that seals the LED chip has a phosphor material dispersed therein, and the phosphor material emits light of a prescribed color through being excited by the blue light emitted from the LED chip. This combination of the LED chip and the phosphor material causes white light to be emitted overall. As the phosphor material, a yellow phosphor material that emits yellow light, a green phosphor material that emits green light, and a red phosphor material that emits red light can be appropriately combined, or one of them can be used on its own, for example. The LEDs 17 are of a so-called top-emitting type in which the side opposite to that mounted onto the LED substrates 18 is a light-emitting surface 17a.

As shown in FIGS. 2 to 4, the LED substrate 18 has a long plate shape expanding along the longer side direction of the chassis 14 (liquid crystal panel 11 and edge portion of light guide plate 19 facing the LEDs 17; X axis direction). In addition, the LED substrate 18 is stored in the chassis 14 with the surface thereof disposed along the Y axis direction and the Z axis direction, or in other words, the surfaces are perpendicular to the planar surfaces of the liquid crystal panel 11 and the light-guiding member 19 (optical members 15), respectively. In other words, the LED substrates 18 are disposed such that the longer side direction of the surface thereof is the same as the X axis direction, the shorter side direction of the surface thereof is the same as the Z axis direction, and the substrate thickness direction perpendicular to the surface is the same as the Y axis direction. The LED substrate 18 is disposed on the bottom side in the vertical direction (Y axis direction) with a prescribed gap with the light guide plate 19. Therefore, the alignment direction of the LEDs 17, the LED substrate 18, and the light guide plate 19 substantially matches the vertical direction (Y axis direction), and the optical axis of each of the LEDs 17, or, the direction of the light in which the intensity of light is greatest, substantially matches the vertical direction (Y axis direction; direction parallel to the surface of the liquid crystal panel 11). The length of the LED substrate 18 is approximately half the length of the chassis 14, and two LED substrates 18 are aligned along the X axis direction. In other words, the LED substrates 18 are in a straight line such that the longer sides thereof are in the same direction as each other and are attached to the chassis 14. The surface of the LED substrate 18 that is on the opposite side of the mounting surface 18a is attached to the inner surface of the side wall 14b of the chassis 14 in the bottom side thereof in the vertical direction. In other words, the LED substrate 18 is interposed between the light guide plate 19 and the bottom side of the chassis 14 in the vertical direction, and the LED substrate 18 is housed from the front side along the Z axis direction with respect to the chassis 14.

The LEDs 17 having the configuration above are mounted on the inner surface of the LED substrate 18, or in other words, the surface facing the light guide plate 19 (surface opposing the light guide plate 19), and this surface is the mounting surface 18a. A plurality of the LEDs 17 are disposed in a row (in a line) with gaps therebetween in the length direction (X axis direction; horizontal direction) on the mounting surface 18a of the LED substrate 18. In other words, the plurality of LEDs 17 are disposed intermittently along the longer side direction on one longer side of the backlight device 12. Wiring patterns (not shown) made of a metal film (copper foil or the like) are formed on the mounting surface 18a of the LED substrate 18, and these wiring patterns extend along the X axis direction and go across the group of LEDs 17 to connect the adjacent LEDs 17 in series. Furthermore, a connecting portion (feed part) 18b for supplying power to the LEDs 17 is provided on an edge portion of the mounting surface 18a of the LED substrate 18 in an edge portion thereof in the length direction (horizontal direction). The connecting portion 18b has a terminal portion (not shown) connected to the edge portion of the wiring pattern, and driving power can be supplied to each of the LEDs 17 from an external LED driving circuit (not shown) by connecting the terminal portion to the LED driving circuit. The connecting portions 18b are respectively provided on edge portions (edge portions in both edges of the light guide plate 19 in the length direction) of two LED substrates 18 adjacent to each other in the X axis direction (horizontal direction) within the chassis 14, in which the edge portions are on the opposite side to edge portions (edge portions toward the middle of the light guide plate 19) adjacent to each other, and the edge portions are disposed further out in the X direction than an orthogonal face 19e of the light guide plate mentioned below. Also, the base material of the LED substrate 18 is made of metal like the chassis 14, and the wiring pattern (not shown) is formed on the LED substrate 18 across an insulating layer. It is also possible to form the base material of the LED substrate 18 using an insulating material such as a ceramic.

The light guide plate 19 is made of a synthetic resin (such as an acrylic, for example) that is almost completely transparent (excellent light transmittance) and has a refractive index that is sufficiently higher than air. As shown in FIGS. 2 and 3, the light guide plate 19 is a rectangular flat plate that is horizontally long in a plan view in a manner similar to the liquid crystal panel 11 and the bottom plate 14a of the chassis 14, and the surface of the light guide plate 19 is parallel to and faces the respective surfaces of the liquid crystal panel 11 and the optical members 15. A proportion of the long side dimension and the short side dimension of the light guide plate 19 is approximately 16:9. The light guide plate 19 is disposed such that the longer side direction of the surface thereof matches the X axis direction, the shorter side direction matches the Y axis direction, and the thickness direction perpendicular to the plate surface thereof matches the Z axis direction. As shown in FIG. 4, the light guide plate 19 is disposed within the chassis 14 directly below the liquid crystal panel 11 and the optical member 15, and one of the exterior edge faces of the liquid crystal panel 11 (bottom side in the vertical direction) on the long side (first edge face) is facing the respective LEDs 17 of the LED substrate 18 disposed on one edge portion in a long side of the chassis 14. Thus, the LEDs 17 (LED substrate 18) and the light guide plate 19 are arranged in the Y axis direction (vertical direction) with respect to each other whereas the optical member 15 (liquid crystal panel 11) and the light guide plate 19 are arranged (stacked) in the Z axis direction with respect to each other, and the two directions are perpendicular to each other. The light guide plate 19 has the function of guiding light emitted in the Y axis direction from the LEDs 17 from the longer side edge faces, propagating the light therein, and emitting the light from the surfaces thereof so as to travel upward toward the optical members 15 (toward the front; light-emission direction).

As shown in FIG. 4, among the surfaces of the light guide plate 19 in a plate shape, the surface facing the front side (surface facing the liquid crystal panel 11 and the optical member 15) is the light-emitting surface 19a that emits light inside toward the optical member 15 and the liquid crystal panel 11. Of the exterior edge faces adjacent to the surface of the light guide plate 19, one of the edge faces is the light-receiving face 19b that receives light emitted from the LEDs 17. This edge face is one of a pair of edge faces in a long side direction (first edge face) that is disposed in the bottom side in the vertical direction and faces the LEDs 17 (LED substrate 18) with a prescribed gap therebetween. The light-receiving face 19b is on a plane parallel to that defined by the X axis (horizontal direction) and the Z axis, and is substantially perpendicular to the light-emitting surface 19a. The alignment direction of the LEDs 17 and the light-receiving face 19b (light guide plate 19) matches the Y axis direction (vertical direction) and is parallel to the light-emitting surface 19a. Of the outer edge faces of the light guide plate 19, the side opposite to the light-receiving face 19b is the opposite face 19d. In other words, the opposite face 19d is the edge face (second edge face) in the long side disposed on the top side in the vertical direction. Of the outer edge faces of the light guide plate 19, a pair of edge faces (third edge face and fourth edge face) in the short side are perpendicular faces that are respectively perpendicular to the light-receiving face 19b and the opposite face 19d. In this manner, three of the outer edge faces of the light guide plate 19 excluding the light-receiving face 19b, or in other words, the opposite face 19d and the pair of perpendicular faces 19e, are non-LED facing edge faces (non-light source facing edge faces) that do not face the LEDs 17. The light guide plate 19 has a pair of perpendicular faces 19e that is disposed closer to the LEDs 17 than to the connecting portion 18b of the LED substrate 18.

As shown in FIG. 3, a position fixing recess 24 is provided in an edge portion of the light guide plate in the long side thereof at the top side in the vertical direction. The position fixing recess 24 is formed by cutting out the edge portion in the horizontally center portion, and the opposite face 19d has an opening in the top side in the vertical direction. The inner face of the position fixing recess 24 includes a pair of vertical parallel faces that are parallel in the vertical direction, and an inner end face disposed on the opposite side to the open end. On the other hand, the bottom plate 14a of the chassis 14 has the position fixing protrusion 25 that fixes the horizontal position of the light guide plate by being inserted into the position fixing recess 24. The position fixing protrusion 25 is disposed in the horizontal center position of the top edge portion of the bottom plate 14a in the vertical direction, and is formed of a substantially circular pin in a plan view that rises along the Z axis direction from the bottom plate 14a toward the front side. The opening width (distance between a pair of vertical parallel surfaces) of a position fixing recess 24 is slightly greater than the outer diameter of the position fixing protrusion 25. Therefore, when the position fixing protrusion 25 is inserted into the position fixing recess 24, the position fixing protrusion 25 abuts at least one of the perpendicular parallel faces. As a result, when the light guide plate 19 thermally expands or thermally contracts, the position fixing recess 24 and the position fixing protrusion 25 are known to expand or contract in the horizontal direction with the position fixing recess 24 and the position fixing protrusion 25 as the starting point, and the pair of perpendicular faces 19e move in a horizontal direction for substantially the same distance each along with the expansion and contraction. The depth of the position fixing protrusion 24 (distance between the open end and the inner end face) is set to be greater than the maximum vertical expanded length of the light guide plate due to thermal expansion, and therefore the thermal expansion of the light guide plate 19 in the vertical direction can be accommodated.

As shown in FIG. 4, of the surfaces of the light guide plate 19, a surface 19c opposite to the light-emitting surface 19a is provided with a reflective sheet R covering the entire surface 19c, and the reflective sheet R is able to reflect light in the light guide plate 19 toward the front. In other words, the reflective sheet R is sandwiched between the bottom plate 14a of the chassis 14 and the light guide plate 19. An edge portion of this reflective sheet R that is on the light-receiving face 19b side of the light guide plate 19 expands farther outward than the light-receiving face 19b, or in other words, expands toward the LEDs 17 side, and the incidence efficiency of light entering the light-receiving face 19b can be improved by reflecting light from the LEDs 17 by this expanded portion. At least one of the light-receiving face 19a of the light guide plate 19, the opposite side face 19c, and a surface of the reflective sheet R is patterned such that a prescribed scattering portion (not shown) with a prescribed surface distribution scatters light within the light guide plate 19. As a result, light emitted from the light-emitting face 19a can be controlled to have an even distribution across the surface.

As shown in FIG. 3, the chassis 14 related to the present embodiment has the supporting member 20, and a portion to be supported 21 of the light guide plate 19 is provided in a position off-center. The portion to be supported 21 is supported in the direction along the surface of the light guide plate 19, or, in the X axis direction (horizontal direction, long side direction, second direction) and the Y axis direction (vertical direction, short side direction, first direction) by the supporting member 20. The light guide plate 19 is supported through the portion to be supported 21 being supported by the supporting member 20. In addition, the light guide plate 19 accommodates positional deviations of the portion to be supported 21 relative to the supporting member 20 in the X axis direction and the Y axis direction caused by thermal expansion and thermal contraction. Among the supporting member 20 and the portion to be supported 21, the portion to be supported 21 has an inclined portion 22 that is inclined such that when portion to be supported 21 is farther outside in the X axis direction, the portion to be supported 21 is farther away from the LEDs 17 in the Y axis direction as the inclined portion 22 expands outward. Therefore, as the light guide plate 19 thermally expands or thermally contracts, the portion to be supported 21 that deviates in position relative to the supporting member 20 is configured to be guided by the inclined portion 22. At this time, the amount of expansion or contraction of the light guide plate 19 in the Y axis direction due to the thermal expansion or thermal contraction thereof is cancelled out by the positional deviation of the portion to be supported 21 through the inclined portion 22, and an effect in which the position of the light-receiving face 19b of the light guide plate 19 relative to the LEDs 17 in the Y axis direction becomes difficult to shift and becomes stable can be obtained. As a result, the above-mentioned effects can be obtained with a simple structure in which the portion to be supported 21 of the structures that support the light guide plate 19, the supporting member 20 and the portion to be supported 21 has an inclined portion 22. Therefore, the present embodiment is excellent in terms of productivity and cost because the entire structure is simplified, the number of parts needed is reduced, and the assembly is easier. Below, a detailed description of the structure regarding the supporting member 20, the portion to be supported 21, and the inclined portion 22 is provided.

Figure 5:
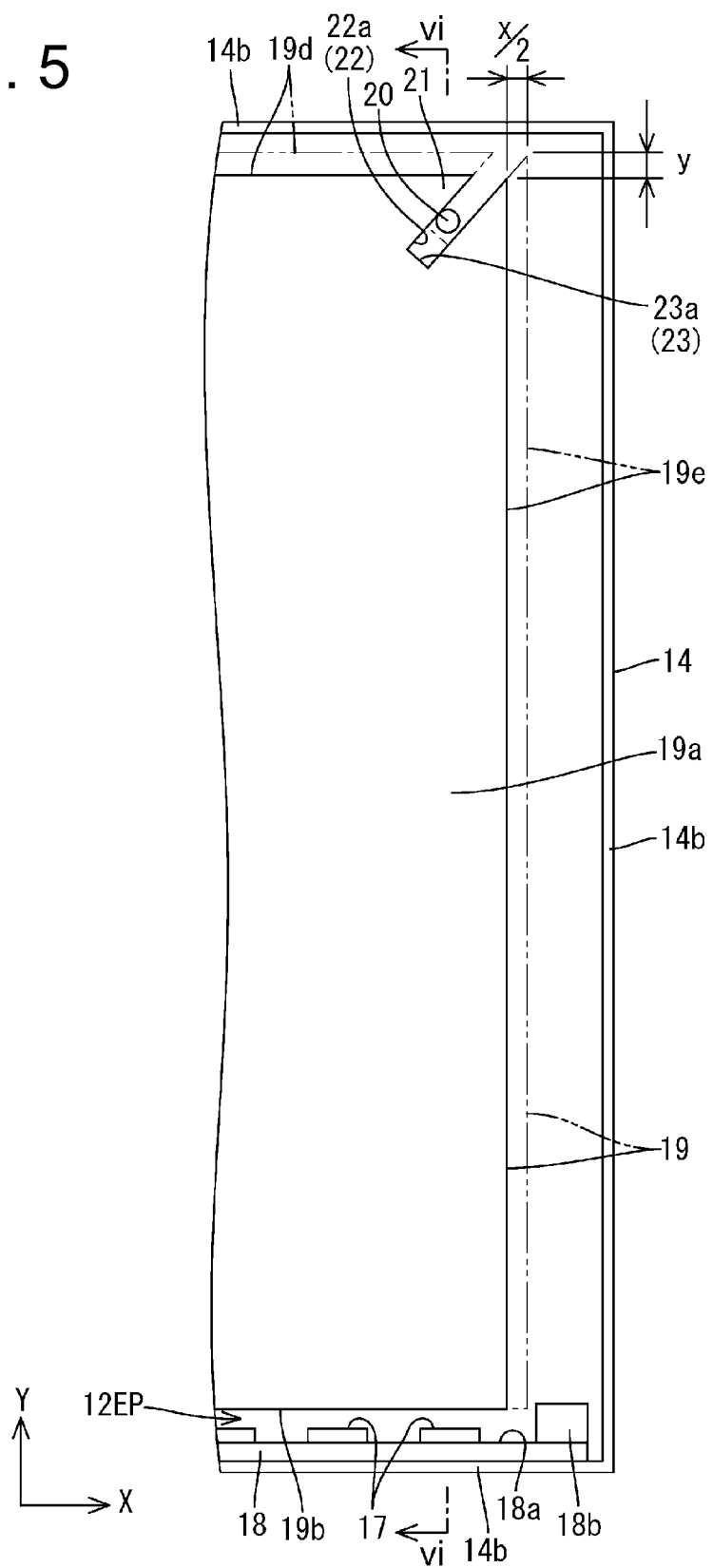
FIG. 5 is a magnified plan view of an edge portion in a horizontal direction of the chassis, the light guide plate, and the LED substrate.
Figure 6:
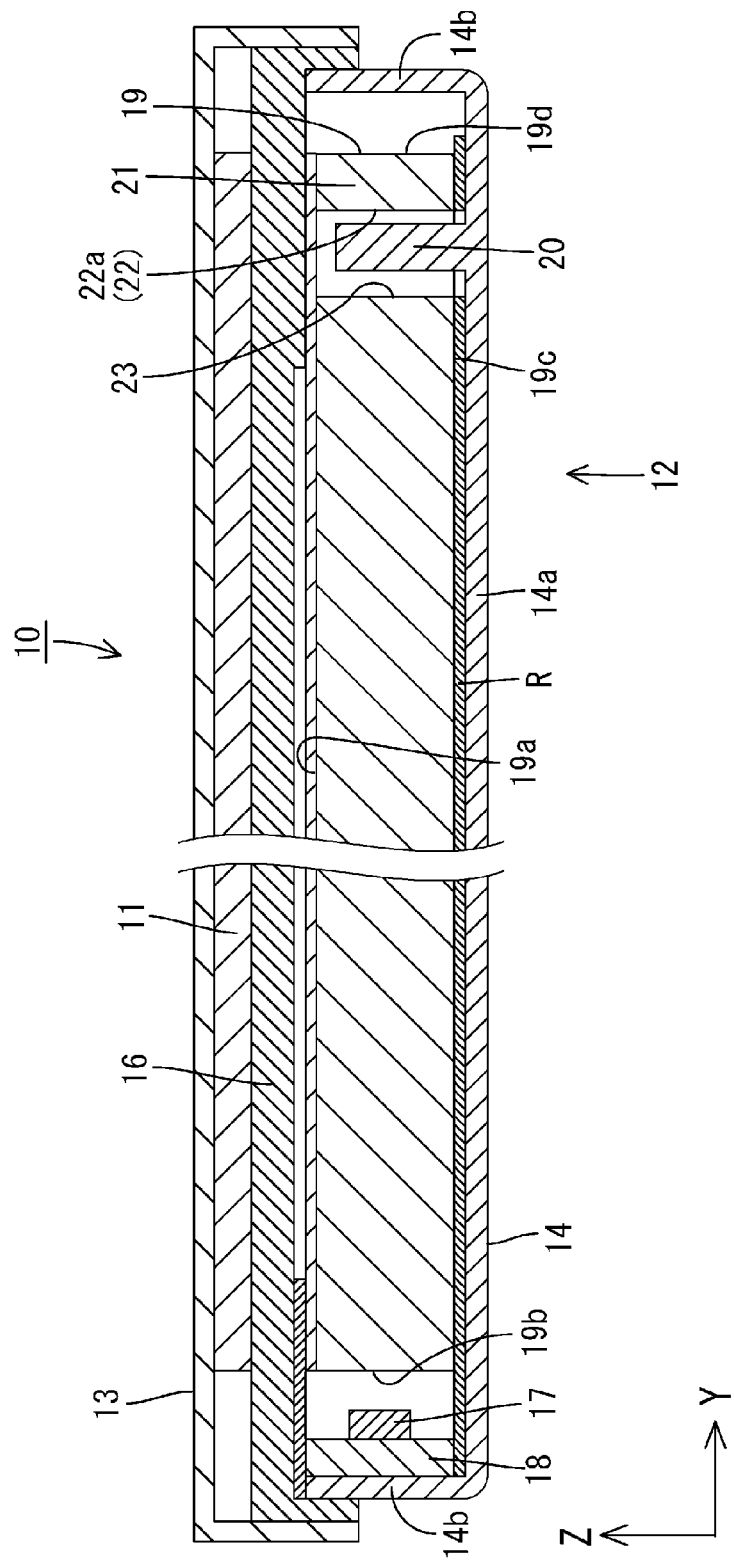
FIG. 6 is a cross-sectional view of FIG. 5 along the line vi-vi.

As shown in FIGS. 5 and 6, the supporting member 20 expands in the Z axis direction from the bottom plate 14a of the chassis 14 toward the front side, or in other words, toward the light guide plate 19. The supporting member 20 is integrally formed with the bottom plate 14a using the process of raising or the like, for example. The supporting member 20 is formed in a substantially columnar shape having a substantially circular cross section, and the peripheral surface of the supporting member 20 has a circular shape surface 20a that is substantially circular in a plan view. The circular shape surface 20a of the supporting member 20 substantially makes point contact with the portion to be supported 21 in a plan view (FIG. 5), and substantially makes line contact with the portion to be supported 21 in a side view. As shown in FIG. 3, a pair of the supporting members 20 is disposed in the vicinity of both top side (vertical direction) edges such that the LEDs 17 disposed farthest out in the horizontal direction (alignment direction of LEDs 17) of the LEDs 17 respectively overlaps the supporting members 20. In a way, this pair of supporting members 20 is disposed such that the light guide plate 19 is sandwiched from both sides in the horizontal direction between the pair of supporting members 20. As a result, the pair of supporting members 20 can stably support the light guide plate 19 in two positions that are separated at a maximum level in the horizontal direction. The supporting member 20 is disposed in a position adjacent to and below (vertical direction) the portion to be supported 21 of the light guide plate 19. Therefore, the supporting member 20 supports the light guide plate 19 from the bottom side thereof in the vertical direction, and thus the supporting member 20 constantly receives the weight of the light guide plate 19. Furthermore, the supporting member 20 is disposed slightly farther to the bottom side in the vertical direction than the opposite surface 19d of the light guide plate 19. The distance between the light-receiving face 19b of the light guide plate 19 and the supporting member 20 is slightly shorter than the short side dimension of the light guide plate 19, but the difference is small enough to be negligible compared to the short side dimension of the light guide plate 19. Therefore, the distance can be similar to the short side dimension of the light guide plate 19.

As shown in FIG. 3, the pair of portions to be supported 21 is formed in both edge portions in the opposite surface 19d side opposite the light-receiving face 19b. The portion to be supported 21 is formed by indenting the opposite surface 19d and the perpendicular face 19e on the respective edge portion in the top side (vertical direction) of the light guide plate 19. Specifically, the portion to be supported 21 is formed of an edge portion of the groove portion 23 that is formed by cutting out the corner portion on the top side (vertical direction) of the light guide plate 19 diagonally with respect to the vertical direction (Y axis direction) and the horizontal direction (X axis direction). The groove portion 23 penetrates the light guide plate 19 along the plate thickness direction (Z axis direction) and opens the opposite face 19d and the perpendicular face 19e outward in the corner portions. The groove portion 23 has a substantially same opening width for the entire length thereof, a pair of inclined portions that are substantially parallel to each other (inclined face 22a of inclined portion 22 mentioned later), and an inner end face 23a disposed on the side opposite the open end. The opening width of this groove portion 23 (distance between the pair of inclined faces) is greater than the outer diameter of the supporting member 20 and therefore the supporting member 20 can be inserted into the groove portion 23. The portion to be supported 21 is formed of the edge portion of the groove portion 23 in the top side portion (vertical direction) thereof. Therefore, the portion to be supported 21 is disposed farther toward the center than the perpendicular face 19e such that the LEDs 17 disposed farthest out in the horizontal direction (alignment direction of LEDs 17) of the LEDs 17 respectively overlaps the portion to be supported 21 in the horizontal direction. The supporting member 20 inserted in the groove portion 23 abuts the bottom side surface (vertical direction) that forms the inclined portion 22 of the portion to be supported 21 mentioned below. The portion to be supported 21 abuts (position of the inclined portion 22) the supporting member 20 in the vertical direction in the vicinity of the top edge (vertical direction) of the light guide plate 19. The distance between the light-receiving face 19b of the light guide plate 19 and the portion to be supported 21 is substantially the same as the distance between the light-receiving face 19b and the supporting member 20 and can be made similar to the short side dimension of the light guide plate 19.

As shown in FIG. 5, the inclined portion 22 faces the bottom side surface of the portion to be supported 21 in the vertical direction. In other words, the inclined portion 22 is formed on the face contacting the supporting member 20, and is formed of the straight inclined face 22a in a plan view. The inclined face 22a is formed with a slope across substantially the entire area in the horizontal direction of the portion to be supported 21. In addition, the inclined face 22a is inclined such that when the inclined face 22a extends farther out from the inner edge position of the portion to be supported 21 in the horizontal direction, the inclined face 22a is farther away from the LEDs 17 in the vertical direction. On the other hand, when the inclined face 22a is closer to the inner edge position than the outer edge position, the inclined face 22a is closer to the LEDs 17 in the vertical direction. In other words, the inclined face 22a has a slope such that the inner edge position thereof in the horizontal direction is close to the bottom side (vertical direction), or in other words, relatively closer to the LEDs 17, and the outer edge position is close to the top side in the vertical direction, or relatively farther away from the LEDs 17. Furthermore, the inclined portion 22 is formed such that the inner edge portion in the horizontal direction protrudes farther toward the bottom side in the vertical direction than the outer edge portion. The inclined portion 22 (portion to be supported 21) is formed such that the distance between the supporting member 20 and the inner end face 23a of the groove portion 23a is slightly greater than the expanded length (maximum expanded length) of the light guide plate 19 thermally expanding to the maximum level in a direction along the inclined portion 22.

Figure 7:
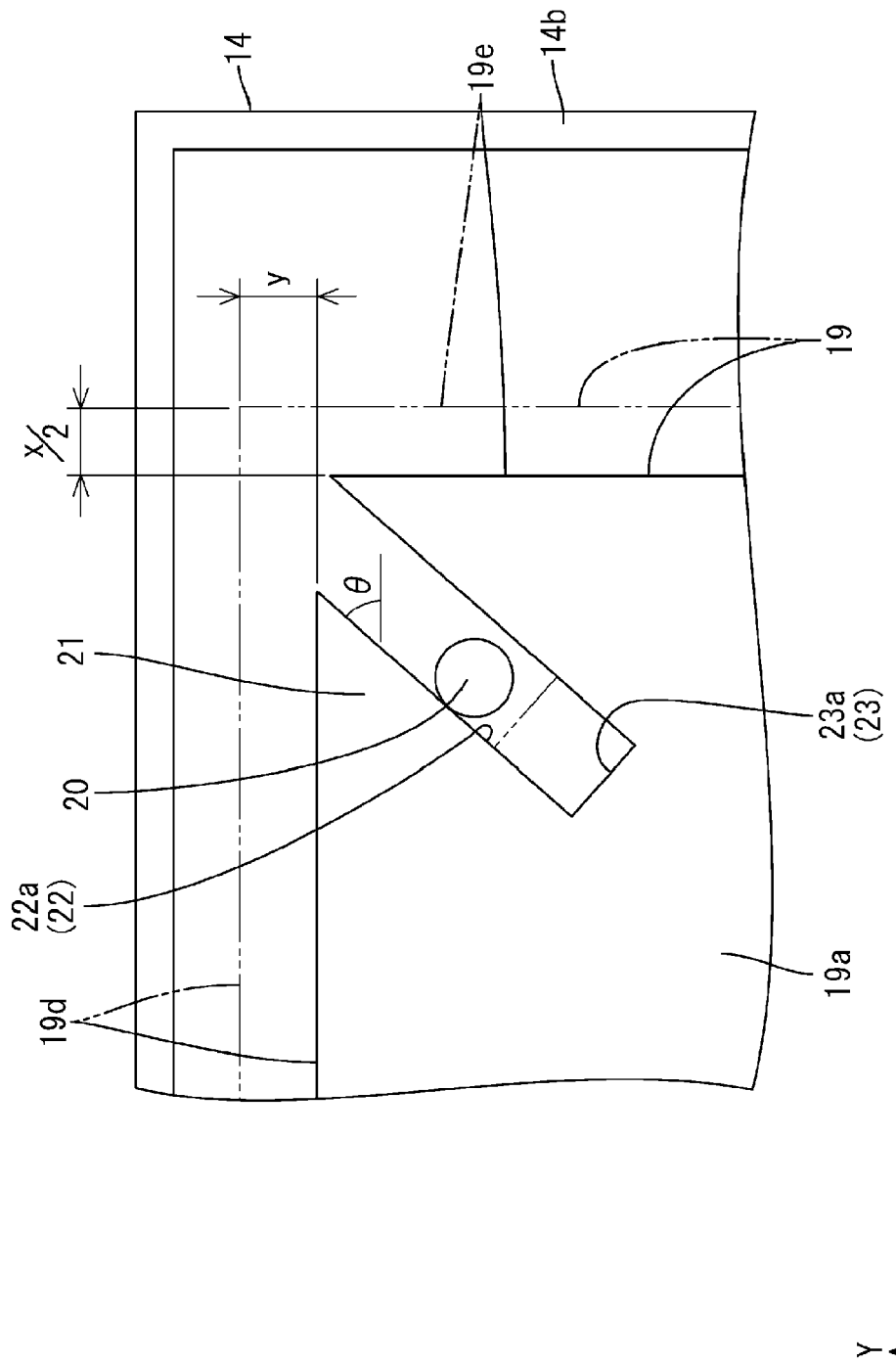
FIG. 7 is a plan view showing an arrangement of the supporting member, portion to be supported, and the inclined portion.

As shown in FIGS. 5 and 7, in a normal temperature, a portion of the inclined portion 22 that is located slightly inward than the outer edge position in the horizontal direction abuts the supporting member 20. As shown in FIGS. 5 and 7, the light guide plate 19 (portion to be supported 21 and inclined portion 22) in a normal temperature is shown in a solid line and the light guide plate 19 expanded due to thermal expansion is shown in a two-dot chain line. The inner edge position (horizontal direction) of the inclined portion 22 is disposed toward the bottom side (vertical direction) of the supporting member 20 and the outer edge position is disposed farther toward the top side (vertical direction) than the supporting member 20. Therefore, if the light guide plate 19 thermally expands from the normal temperature state, then because the light guide plate 19 expands outward along the horizontal direction, the abutting position of the inclined portion 22 to the supporting member 20 shifts relatively inward of the inclined portion 22. At this time, the portion to be supported 21 and the entire light guide plate 19 shifts upward in the vertical direction due to the supporting member 20 being guided by the inclined face 22a of the inclined portion 22. On the other hand, the light guide plate 19 that thermally expands outward in the vertical direction, and the light-receiving face 19b thereof, shifts downward (outward) in the vertical direction so as to be closer to the LEDs 17, and the edge face 19d on the opposite side shifts upward (outward) in the vertical direction such that the edge face 19d is farther away from the LEDs 17. Therefore, because the amount in which the portion to be supported 21 (entire light guide plate 19) shifts upward in the vertical direction due to the inclined portion 22 being guided is cancelled out by the amount in which the light-receiving face 19b of the light guide plate 19 thermally expands to the bottom side in the vertical direction makes the light-receiving face 19b less susceptible to shifting relative to the LEDs 17.

On the other hand, as shown in FIGS. 5 and 7, when the light guide plate 19 that is thermally expanded thermally contracts, the abutting position of the supporting member 20 to the inclined portion 22 shifts relatively outward in the inclined portion 22. At this time, the portion to be supported 21 and the entire light guide plate 19 shifts downward in the vertical direction due to the supporting member 20 being guided by the inclined face 22a of the inclined portion 22. On the other hand, the light guide plate 19 that thermally contracts is contracted in the vertical direction and inward, and the light-receiving face 19b is shifted upward (inward) in the vertical direction such that the light-receiving face 19b is farther away from the LEDs 17, and the edge face 19d in the side opposite the light-receiving face 19b shifts downward (inward) in the vertical direction so as to be closer to the LEDs 17. Therefore, the amount the portion to be supported 21 shifts downward in the vertical direction by being guided by the inclined portion 22 is cancelled out by the amount the light-receiving face 19b of the light guide plate 19 shifts upward caused by the heat contraction. As a result, the light-receiving face 19b is less susceptible to shifting relative to the LEDs 17.

As shown in FIG. 7, when the inclined portion 22 having the structure mentioned above is provided in the portion to be supported 21, the set value of the inclination angle θ of the inclined portion 22 (inclined face 22a) to the horizontal direction becomes important. This is because the amount in which the portion to be supported shifts in the vertical direction due to the inclined portion 22 is substantially fixed by the expansion and contraction amount in the horizontal direction of the light guide plate 19 and the inclination angle θ of the inclined portion 22. Below, a general formula for calculating the inclination angle θ of the inclined portion 22 is explained.

As shown in FIG. 5, the light guide plate 19 expands and contracts in the vertical direction with the supporting position (abutting position) as the starting point when the light guide plate 19 thermally expands or thermally contracts. At this time, the light-receiving face 19b that is a bottom side edge face (vertical direction) of the light guide plate 19 and the opposite face 19d thereof that is the top side edge face shift to the opposite direction to each other along the vertical direction, but the amount of shifting changes according to the support position. Specifically, the amount of shifting "Δy1" in the vertical direction due to thermal expansion or thermal contraction can be calculated by formula (1) shown below by multiplying the ratio of the distance "D" between the support position of the supporting member 20 that supports a dimension (short side dimension) in the vertical direction of the light guide plate 19 and the light-receiving face 19b and the amount of contraction for the entire vertical direction "y." In the present embodiment, the values of "D" and "Lv" are substantially the same, and thus "Δy1" and "y" are substantially the same.

<Formula 1>

$$\Delta y1 = y \cdot D/Lv \quad (1)$$

Meanwhile, as shown in FIG. 3, the light guide plate 19 contracts in the horizontal direction with the substantially center position as the starting point, and the amount of expansion and contraction is substantially even in both left and right sides in the horizontal direction. Therefore, if the amount of expansion and contraction in the horizontal direction of the entire light guide plate is "x," the amount of shifting (horizontal direction) of the respective supporting members 20 forming a pair to the respective portions to be supported 21 becomes "x/2". As mentioned above, if the light guide plate 19 expands or contracts along the horizontal direction, then the portion to be supported 21 that abuts the supporting member 20 is guided by the inclined portion 22 in the horizontal direction and the portion to be supported 21 and the light guide plate 19 shifts in the vertical direction. The amount of vertical shifting "Δy2" of the portion to be supported 21 and the light guide plate 19 by the inclined portion 22 can be calculated by multiplying the tangent "tan θ" of the inclination angle "θ" of the inclined portion 22 to the amount of contraction "x/2" of the portion to be supported 21 in the horizontal direction.

<Formula 2>

$$\Delta y2 = x \cdot \tan \theta / 2 \quad (2)$$

Next, as shown in formula (3) below, if "Δy1" in formula (1) and "Δy2" in formula (2) are equal, then the amount of shifting "Δy1" in the vertical direction caused by thermal expansion or thermal contraction of the light-receiving face 19b is cancelled out by the amount of shifting "Δy2" in the vertical direction of the portion to be supported 21 and the light guide plate 19 caused by the inclined portion 22 and the difference becomes 0. If the difference of "Δy1" and "Δy2" is 0, then the light-receiving face 19b is substantially not moving relative to the LEDs 17, and the distance between the light-receiving face 19 and the LEDs 17 is substantially constant (see FIG. 5). Therefore, the inclination angle θ of the inclined portion 22 that satisfies the condition for the distance between the light-receiving face 19b and the LEDs 17 to be substantially constant can be calculated by formula (4) below.

<Formula 3>

$$x \cdot \tan \theta / 2 = y \cdot D/Lv \quad (3)$$

<Formula 4>

$$\tan \theta = 2y \cdot D/x \cdot Lv \quad (4)$$

As shown in FIG. 3, the ratio of the amount in which the entire light guide plate 19 contracts "x" in the horizontal direction and the amount in which the entire light guide plate 19 contracts "y" in the vertical direction is equal to the ratio of the horizontal dimension (long side dimension) of the light guide plate 19 "Lh" to the vertical dimension (short side dimension) "LV," and "x, y" in formula (4) can be respectively replaced by "Lh, Lv" shown in formula (5) below. Formula (6) can be obtained by reorganizing formula (5). According to formula (6), the slanted angle θ of the inclined portion 22 can be obtained by the distance "D" from the support position to the light-receiving face 19b and the horizontal dimension "Lh" in the horizontal direction of the light guide plate 19. The ratio of the dimension (short side dimension) in the vertical direction "Lv" and the dimension (long side dimension) in the horizontal direction "Lh" is approximately "9:16" and thus as long as the dimension value of one of the vertical dimension "Lv" and the horizontal dimension "Lh" is known, the other dimension value can be calculated. In order to calculate the inclination angle θ from the vertical dimension "Lv" and the distance "D," formula (7) below can be used. In the present embodiment, the inclination angle θ of the inclined portion 22 is defined based on formula (6) or formula (7), for example, and if "D" and "Lv" are the same value, the value of the inclination angle θ is approximately "48 degrees."

<Formula 5>

$$\tan \theta = 2Lv \cdot D/Lh \cdot Lv \quad (5)$$

<Formula 6>

$$\tan \theta = 2D/Lh \quad (6)$$

<Formula 7>

$$\tan \theta = 9D/8Lv \quad (7)$$

Furthermore, if the ratio of the vertical dimension (short side dimension) "Lv" of the light guide plate 19 and the horizontal dimension (long side dimension) "Lh" is generalized as "a:b," then the general formula for calculating the inclination angle θ of the inclined portion 22 is the following formula (8).

<Formula 8>

$$\tan \theta = 2a \cdot D/b \cdot Lv \quad (8)$$

Meanwhile, if the amount of shifting "Δy2" of the portion to be supported 21 and the light guide plate 19 caused by the inclined portion 22 in the vertical direction is greater than the amount of shifting "Δy1" in the vertical direction of the light-receiving face 19b caused by thermal expansion or thermal contraction of the light-receiving face 19b, then the light-receiving face 19b shifts in the vertical direction so as to move away from the LEDs 17 especially during thermal expansion, and thus at least the light-receiving face 19b moving closer to the LEDs 17 can be avoided. Therefore, the inclination angle θ of the inclined portion 22 that satisfies the condition in which the light-receiving face 19b does not interfere with the LEDs 17 for sure can be calculated using formula (9) below. The right side of formula (9) can be switched with the respective right sides of the formulas (4), (5), (7), and (8).

<Formula 9>

$$\tan \theta > 2D/Lh \qquad (9)$$

Furthermore, compared to the amount of shifting "Δy1" in which the 19b shifts in the vertical direction due to the thermal expansion and the thermal contraction thereof, if the amount of shifting "Δy2" in the vertical direction of the portion to be supported 21 and the light guide plate 19 caused by the inclined portion 22 is greater or equal, then the light-receiving face 19b shifts so as to move away from the LEDs 17 in the vertical direction during thermal expansion, or the distance between the light-receiving face 19b and the LEDs 17 is substantially constant. Therefore, the whether the light-receiving face 19b shifts so as to move farther away from the LEDs 17 when the light-receiving face 19b thermally expands or the inclination angle θ of the inclined portion 22 that satisfies the condition in which the distance between the light-receiving face 19b and the LEDs 17 is substantially constant can be calculated using formula (10). The right side of formula (10) can be switched with the respective right sides of the formulas (4), (5), (7), and (8).

<Formula 10>

$$\tan \theta \geq 2D/Lh \qquad (10)$$

In terms of positioning the supporting structure of the light guide plate 19, if a structure in which the supporting member is directly abutted to the light-receiving face 19b of the light guide plate is adopted, the light guide plate 19 will thermally expand or thermally contract with the light-receiving face 19b as the starting point, and therefore, the problem of the light-receiving face 19b shifting with respect to the LEDs 17 rarely occurs. However, if the supporting member is directly abutted to the light-receiving face 19b, then there is a risk that the supporting member blocks light from the LEDs 17 causing uneven brightness. Meanwhile, if a structure in which the light guide plate 19 is expanded in the horizontal direction to be farther away from the LEDs 17 and a supporting member is abutted to the expanded portion is adopted, then a problem occurs in which the light guide plate 19 becomes larger and the frame portions of the backlight device and the liquid crystal display device expand. On the other hand, in the present embodiment, a case in which the supporting structure of the light guide plate 19 blocks light from the LEDs 17 entering and transmitted through the light guide plate 19 can be made less likely by disposing the supporting member 20 and the portion to be supported 21 that are supporting structures of the light guide plate 19 in corner portions of the opposite face 19d thereof that is disposed on the opposite side to the light-receiving face 19b (LEDs 17). As a result, the size of the light guide plate 19 is reduced in the vertical and horizontal direction, and even if the supporting structure of the light guide plate 19 overlaps the LEDs 17 in the horizontal direction, a case in which the supporting structure of the light guide plate 19 blocks the light being transmitted through the light guide plate 19 becomes less likely to occur, and thus is suitable for narrowing the frame of the backlight device 12 and the liquid crystal display device 10. If the supporting structure of the light guide plate 29 is disposed on the corner portion of the opposite surface 19d side, then the light-receiving face 19b shifting relative to the LEDs 17 when the light guide plate 19 thermally expands or thermally contracts is a concern, but by providing an inclined portion 22 to the portion to be supported 21, the shifting of the light-receiving face 19b due to the expansion or contraction of the light guide plate can be cancelled out, and the distance between the LEDs 17 and the light-receiving face 19b can be kept substantially constant.

The present embodiment has the above-mentioned structure, and the operation thereof will be explained next. When the liquid crystal display device 10 having this configuration is powered ON, the driving of the liquid crystal panel 11 is controlled by a control circuit (not shown), and the driving of the LEDs 17 on the LED substrate 18 is controlled by the LEDs 17 being supplied with driving power from the LED driver circuit (not shown). Light from the respective LEDs 17 are radiated to the liquid crystal panel 11 through the optical member 15 by being guided by the light guide plate 19 and a prescribed image is displayed on the liquid crystal panel 11. Next, the operation of the backlight device 12 will be explained in detail.

As shown in FIG. 4, if the respective LEDs 17 are lit, then the light emitted from the LEDs 17 enter the light-receiving face 19b of the light guide plate 19. Although there is a prescribed gap between the LEDs 17 and the light-receiving face 19b, because an expanded portion of a reflective sheet R is provided on the rear side of the gap, the light from the LEDs 17 can be reflected to the light-receiving face 19b by this expanded portion. As a result, the incidence efficiency of light entering the light-receiving face 19b is high. In the process of travelling through the light guide plate 16 while being subject to total reflection at the boundary faces between the light guide plate 16 and external air spaces, or being diffused or the like by the reflective sheet R, the light incident to the light-receiving face 19b is guided to be emitted from the light-emitting surface 19a such that the angle of incidence of the light to the light-emitting surface 19a does not exceed the critical angle.

The respective LEDs 17 generate heat when the liquid crystal display device 10 is used and the respective LEDs 17 are lit, and there are also other cases in which the external temperature becomes high. When the internal temperature of the liquid crystal display device 10 becomes high due to heat from the respective LEDs 17 or external heat being transferred and exceeds the assumed temperature as configured, then the parts of the liquid crystal display device 10 thermally expands. Among the parts of the liquid crystal display device 10, if the light guide plate 19 thermally expands, then the light guide plate 19 expands in the horizontal direction (X axis direction, long side direction, second direction) and the vertical direction (Y axis direction, short side direction, first direction). As shown in FIG. 3, because the light guide plate 19 is fixed in the horizontal direction by the position fixing recess 24 being inserted into the position fixing protrusion 25, the light guide plate 19 expands substantially evenly to the left and the right in the horizontal direction with the position fixing protrusion 25 and the position fixing recess 24 being the starting point. Therefore, the pair of portions to be supported 21 shifts outward relative to the pair of supporting members 20 disposed on both edges in the horizontal direction of the light guide plate 19 and the chassis 14 by about half the expanding amount of the entire light guide plate 19. At this time, the light-receiving face 19b of the light guide plate 19 shifts downward in the vertical direction by about the same amount as the extension of the entire light guide plate 19 in the vertical direction (see formula (1) mentioned above).

On the other hand, as shown in FIGS. 5 and 7, when the portion to be supported 21 shifts outward to the supporting member 20 in the horizontal direction as the light guide plate 19 extends in the horizontal direction, the supporting member 20 disposed below the portion to be supported 21 in the vertical direction receives the weight of the light guide plate, and thus the portion to be supported 21 continues to abut the supporting member 20 through the inclined portion 22, but shifts outward in the horizontal direction. Then, if the inclined portion 22 slides with respect to the portion to be supported 20, then by being guided by the inclined face 22a, the portion to be supported 21 shifts upward in the vertical direction to the supporting member 20, or in other words, shifts away from the LEDs 17 (see formula (2) mentioned above). Therefore, the shifting of the portion to be supported 21 in the horizontal direction due to the light guide plate 19 expanding in the horizontal direction is converted to a movement in which the portion to be supported 21 and the light guide plate 19 shift upward in the vertical direction, and thus the inclined portion 22 functions as a cam. The shifting of the portion to be supported 21 in the vertical direction caused by the inclined portion 22 being guided is in the opposite direction to the shifting of the light-receiving face 19b of the light guide plate 19 due to the thermal expansion, and thus the two cancel each other out. As a result, the relative position of the light-receiving face 19b to the LEDs 17 is less likely to change. Especially, in the present embodiment, the inclination angle "θ" of the inclined portion 22 to the horizontal direction is set based on the formulas (6) to (10), and thus, the amount of shifting of the portion to be supported 21 in the vertical direction caused by the inclined portion 22 being guided, and the amount of shifting in the vertical direction of the light-receiving face 19b of the light guide plate 19 due to thermal expansion is substantially equal. Therefore, the relative position of the light-receiving face 19b to the LEDs 17 is maintained as substantially constant, and as a result, the incident efficiency of light to the light-receiving face 19b becomes more stable and uneven brightness of light emitted from the light guide plate 19 becomes less likely to occur. In addition, a case in which the light-receiving face 19b interferes with the LEDs 17 can be reliably prevented.

Meanwhile, if the liquid crystal display device 10 that was used is turned off, then the respective LEDs 17 are turned off, and the internal temperature of the liquid crystal display device 10 decreases, and thermal contraction of the parts that were thermally expanded takes place. As shown in FIG. 3, the light guide plate 19 contracts in the horizontal direction and the vertical direction due to the thermal contraction, and the respective portions to be supported 21 shifts inward in the horizontal direction to the respective supporting members 20 by approximately half the entire amount of contraction of the light guide plate 19 in the horizontal direction. At this time, the light-receiving face 19b of the light guide plate 19 shifts upward in the vertical direction by about the same amount as the contraction of the entire light guide plate 19 in the vertical direction (see formula (1) mentioned above).

On the other hand, as shown in FIGS. 5 and 7, when the portion to be supported 21 shifts inward to the supporting member 20 in the horizontal direction as the light guide plate 19 contracts in the horizontal direction, the supporting member 20 disposed below the portion to be supported 21 in the vertical direction receives the weight of the light guide plate, and thus the portion to be supported 21 continues to abut the supporting member 20 through the inclined portion 22, but shifts inward in the horizontal direction. Then, if the inclined portion 22 slides with respect to the portion to be supported 20, then by being guided by the inclined face 22a, the portion to be supported 21 shifts downward in the vertical direction to the supporting member 20, or in other words, shifts toward the LEDs 17 (see formula (2) mentioned above). Therefore, the shifting of the portion to be supported 21 in the horizontal direction due to the light guide plate 19 contracting in the horizontal direction is converted to a movement in which the portion to be supported 21 and the light guide plate 19 shift downward in the vertical direction, and thus the inclined portion 22 functions as a cam. The shifting of the portion to be supported 21 in the vertical direction caused by the inclined portion 22 being guided is in the opposite direction to the shifting of the light-receiving face 19b of the light guide plate 19 due to the thermal contraction, and thus the two cancel each other out. Especially, in the present embodiment, the inclination angle "θ" of the inclined portion 22 to the horizontal direction is set based on the formulas (6) to (10), and thus, the amount of shifting of the portion to be supported 21 in the vertical direction caused by the inclined portion 22 being guided, and the amount of shifting in the vertical direction of the light-receiving face 19b of the light guide plate 19 due to thermal contraction is substantially equal. Therefore, the position of the light-receiving face 19b relative to the LEDs 17 in the vertical direction is maintained at a substantially constant level.

As explained above, the backlight device (illumination device) 12 of the present embodiment has the LEDS (light source) 17, the light guide plate 19 formed in a rectangular plate shape having on an edge face thereof the light-receiving face 19b facing the LEDs 17 and the opposite face 19d on a side opposite the light-receiving face 19b, and the light-emitting surface 19a that emits light from the surface, the portion to be supported 21 disposed on the corner portion on the opposite face 19d side, and when the alignment direction in which the LEDs 17 and the light guide plate 19 are aligned is the first direction (vertical direction) and the direction that is perpendicular to the first direction and is in a direction along the light-receiving face 19a of the light guide plate is the second direction (horizontal direction), then the backlight device 12 also includes the supporting member 20 that supports the light guide plate 19 in the first direction and the second direction, and the inclined portion 22 that is slanted with respect to the first direction and the second direction such that the inclined portion 22 is farther away from the LEDs 17 in the first direction when moving toward the outside in the second direction.

In this manner, light from the LEDs 17 is emitted from the light-emitting surface 19a after being transmitted in the light guide plate 19. If the temperature in the backlight device 12 increases as the LEDs 17 are turned on, the light guide plate 19 extends in the first direction and the second direction due to thermal expansion. Thus, the light-receiving face 19b shifting toward the LEDs 17 in the first direction is concerned. Because the light guide plate 19 is supported in the first direction and the second direction through the supporting member 20 being abutted to the portion to be supported 21, if the light guide plate 19 is thermally expanded, then the portion to be supported 21 shifts with respect to the supporting member 20 in the first direction and the second direction.

At least one of the portion to be supported 21 and the supporting member 20 has an inclined portion 22 that is slanted with respect to both the first direction and the second direction such that when the inclined portion 22 is farther away from the LEDs 17 in the first direction when expanding outward in the second direction. Therefore, the portion to be supported 21 shifts outward in the second direction with respect to the supporting member 20 and farther away from the LEDs 17 in the first direction by being guided by the inclined portion 22 when the light guide plate 19 thermally expands. At this time, the light-receiving face 19b of the light guide plate 19 also shifts in a similar manner to the portion to be supported 21. As a result, the amount the light-receiving face 19b shifts toward the LEDs 17 as the light guide plate 19 extends in the first direction due to thermal expansion is cancelled out by the amount the portion to be supported 21 shifts away from the LEDs 17 in the first direction by being guided by the inclined portion 22. Therefore, the distance between the LEDs 17 and the light-receiving face 19b becomes unlikely to change.

Meanwhile, if the temperature of the backlight device 12 decreases, then the light guide plate 19 contracts in the first direction and the second direction as heat contraction takes place. In this case, as the portion to be supported 21 is guided by the inclined portion 22 when the light guide plate 19 thermally contracts, the portion to be supported 21 shifts inward in the second direction relative to the supporting member 20 and shifts toward the LEDs 17 in the first direction. As a result, the amount the light-receiving face 19b shifts away from the LEDs 17 by the light guide plate 19 contracting in the first direction is cancelled out by the light-receiving face 19b shifting towards the LEDs 17 in the first direction, and the distance between the LEDs 17 and the light-receiving face 19b becomes unlikely to change.

As mentioned above, by using a simple structure in which at least one of the portion to be supported 21 and the supporting member 20 that support the light guide plate 19 has an inclined portion 22, problems that occur as the light guide plate 19 expands and contracts can be resolved. Specifically, the problem in which the distance between the LEDs 17 and the light-receiving face 19b changing can be resolved. As a result, the incidence efficiency of light entering the light-receiving face 19b becomes stable and the light emitted from the light guide plate 19 becomes less likely to have uneven brightness, and the light-receiving face 19b can be prevented from interfering with the LEDs 17.

Furthermore, the portion to be supported 21 is provided in the corner portion of the opposite face 19d side that is disposed to the side opposite the light-receiving face 19b of the corner portion of the light guide plate 19 formed in a rectangular plate shape, and therefore light entering the light-receiving face 19b of the light guide plate 19 from the LEDs 17 is unlikely to be blocked by the portion to be supported 21 while being transmitted through the light guide plate 19. Along with the narrowing of the frame of the backlight device 12, if the light guide plate 19 is made smaller in the second direction, then the portion to be supported 21 is disposed closer to the LEDs 17 in the second direction and there is a concern that the portion to be supported 21 will block light. On the other hand, if the portion to be supported 21 is provided on the opposite surface 19d side of the corner portion of the light guide plate 19 as mentioned above, then the portion to be supported 21 is less likely to block light, and this is suitable for making the backlight device 12 narrower.

Furthermore, the portion to be supported 21 is formed by forming a dent in the edge face (opposite face 19d and perpendicular face 19e). This method is more suitable for narrowing the frame of the backlight device 12 when compared to a case in which the portion to be supported is formed by forming a protrusion in a portion of an edge face of the light guide plate. If the portion to be supported 21 is formed by indenting a portion of an edge face of the light guide plate 19, then the portion to be supported 21 blocking light transmitted within the light guide plate 19 is a concern. However, by providing the portion to be supported 21 in the corner portion of the opposite face 19d of the light guide plate 19, the portion to be supported is less likely to block light.

Furthermore, the portion to be supported 21 is disposed in a position that overlaps the LEDs 17 in the second direction. In this case, the portion to be supported 21 blocking light from being transmitted within the light guide plate 19 is a concern, but by providing the portion to be supported 21 in the corner portion in the opposite face 19d side of the light guide plate 19, the portion to be supported 21 is less likely to block light. Thus, this is more suitable for narrowing the frame of the backlight device 12.

Furthermore, the LED substrate (light source substrate) 18 that is formed in a plate shape that extends along the second direction is a connector (power supply member) for supplying power to an edge portion of the LEDs 17 in the second direction, and the connector 18b is disposed toward the outside with respect to the light guide plate 19. In this manner, an edge portion of the light guide plate 19 in the second direction is disposed further inward than the connector 18b in the second direction, and thus compared to if the edge portion of the light guide plate 19 in the second direction overlap the connector 18b, the size of the light guide plate 19 is reduced in the second direction and thus the backlight device 12 can be made even narrower.

The inclined portion 22 is formed of the inclined face 22a that is in a straight line. In this manner, the amount in which the portion to be supported 21 shifts in the first direction due to the thermal expansion or thermal contraction of the light guide plate 19 can be by setting the inclination angle of the inclined face 22a with respect to the first direction or the second direction according to the position or the like of the portion to be supported 21 of the light guide plate 19 in the first direction can be fixed. Therefore, the design and production is simpler and the cost is better compared to if the inclined portion 22 is formed of a curved face.

The portion to be supported 21, the supporting member 20, and the inclined portion 22 are respectively disposed in both edges in the second direction of the light guide plate 19. In this manner, the light guide plate 19 is stably supported from both sides in the second direction by the portion to be supported 21 and the supporting member 20 that are respectively disposed as a pair. Furthermore, if the light guide plate 19 thermally expands or thermally contracts, then the pair of portions to be supported 21 that is disposed in two edges in the second direction respectively, and the portions to be supported 21 respectively shift outward or inward in the second direction.

Furthermore, the first direction substantially matches the vertical direction and the second direction substantially matches the horizontal direction, and the supporting member 20 is disposed so as to support the portion to be supported 21 from below in the vertical direction. In this manner, the light guide plate 19 is supported through the portion to be supported 21 that is supported by the supporting member 20 from the bottom side in the vertical direction, and the abutting state of the portion to be supported 21 and the supporting member 20 is maintained and a stable support can be obtained. Even if thermal expansion or thermal contraction takes place in the light guide plate 19, the portion to be supported 21 stays abutted to the supporting member by the weight of the light guide plate 19 when shifting, and thus the inclined portion 22 guides the portion to be supported 21 more appropriately. Therefore, the guiding function of the inclined portion 22 of the light guide plate 19 can be sufficiently exhibited, and the problems that occur due to the expansion or contraction of the light guide plate can be more reliably resolved.

The inclined portion 22 is provided on at least the portion to be supported 21. In this manner, because the portion to be supported 21 is a portion of the light guide plate 19, the inclined portion 22 can be easily provided in the portion to be supported 21.

In addition, the present embodiment has the chassis 14, and the chassis 14 houses the LEDs 17 and the light guide plate 19 and has the bottom plate 14*a* that is parallel to the surface of the light guide plate 19. Furthermore, the supporting member 20 is provided in a form rising from the bottom plate 14*a* of the chassis 14 towards the light guide plate 19. In this manner, the supporting member 20 is provided in a form rising from the bottom plate 14*a* of the chassis 14 housing the LEDs 17 toward the light guide plate 19, and thus the light guide plate 19 can be supported in a more appropriate position relative to the LEDs 17 by the supporting member 20.

Embodiment 2

Embodiment 2 of the present invention will be described with reference to FIG. 8 or 9. In Embodiment 2, an embodiment in which the shape of a portion to be supported 121 and the number of supporting members 120 provided are changed is shown. Descriptions of structures, operations, and effects similar to those of Embodiment 1 will be omitted.

Figure 8:
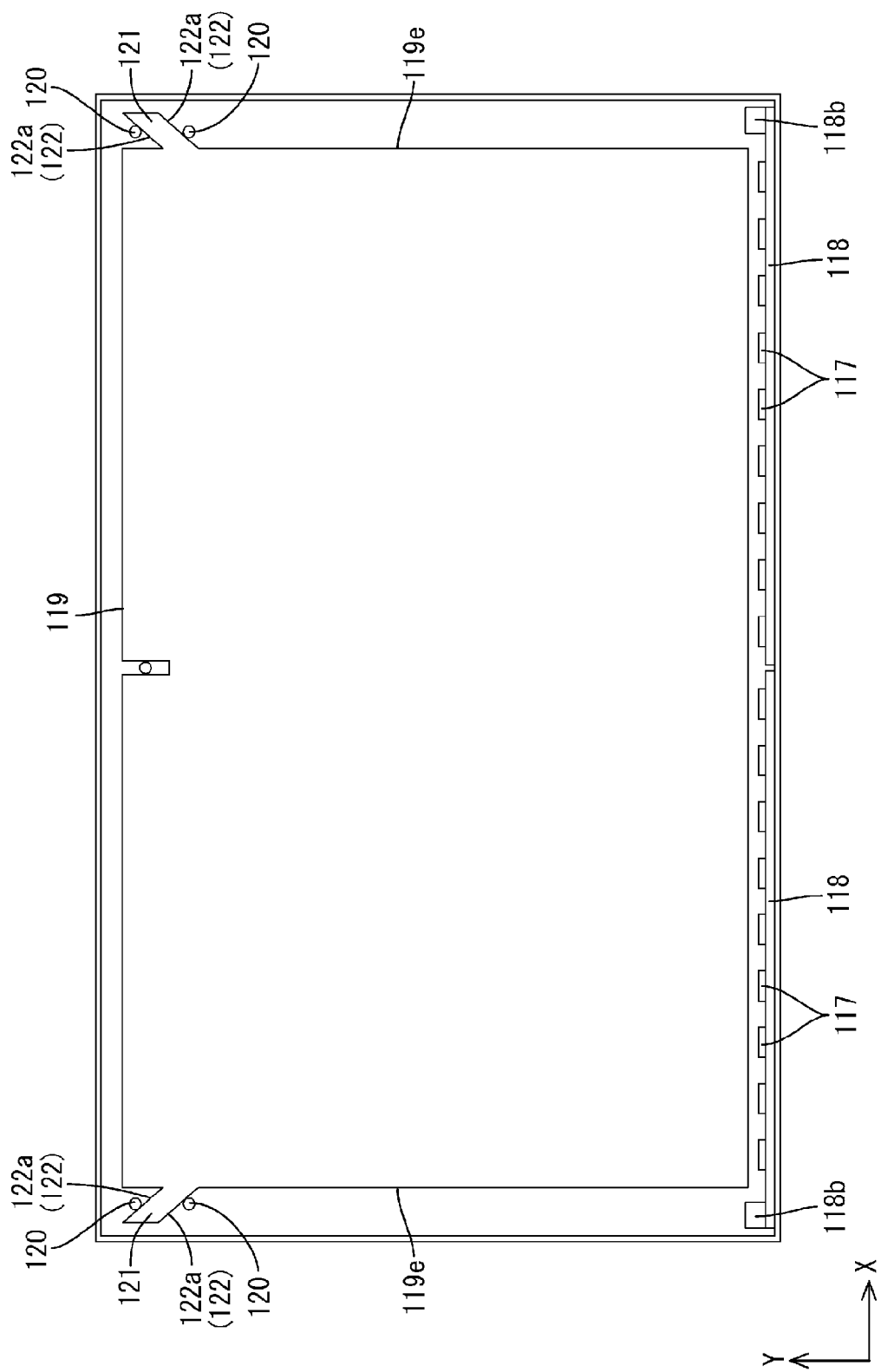
FIG. 8 is a plan view showing an arrangement of a chassis, a light guide plate, and an LED substrate related to Embodiment 2 of the present invention.
Figure 9:
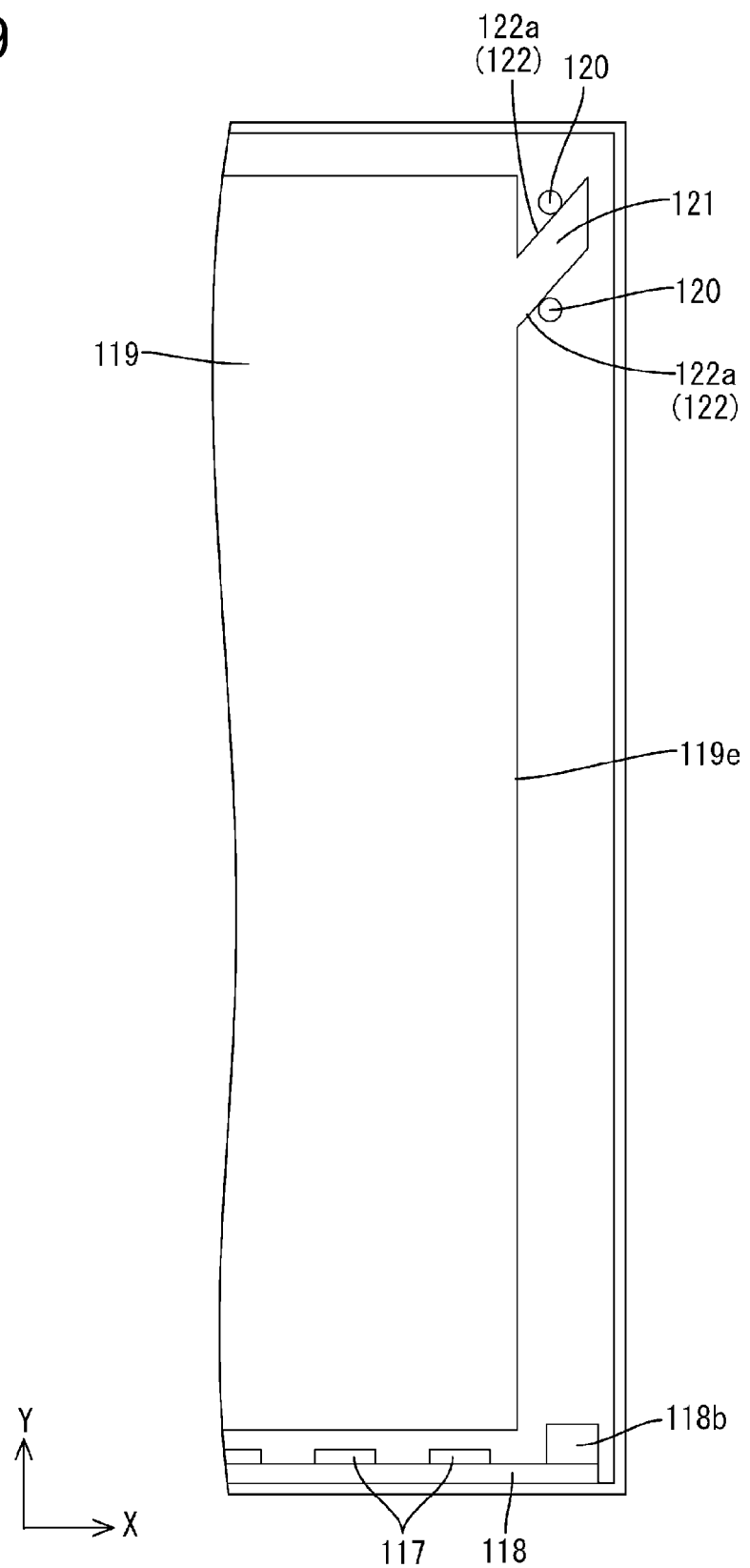
FIG. 9 is a magnified plan view of an edge portion in a horizontal direction of the chassis, the light guide plate, and the LED substrate.

As shown in FIGS. 8 and 9, the portion to be supported 121 related to the present embodiment is formed by forming a protrusion on a portion of an edge face of the light guide plate 119. Specifically, the portion to be supported 121 is formed of protruding parts that respectively protrude from a vicinity of an upper edge portion in the vertical direction (Y axis direction) of the perpendicular face 119*e* of the peripheral faces of the light guide plate 119 in a diagonally upward direction. The portion to be supported 121 does not overlap the LEDs 117 held by the LED substrate 118 in the horizontal direction, but are disposed in a position that overlap the connector 118*b*. The portion to be supported 121 has a pair of inclined faces 122*a* on the top and bottom thereof inclined with respect to both the vertical direction and the horizontal direction (X axis direction). The portion to be supported 121 has the same width for substantially the entire length and the pair of inclined faces 122*a* are substantially parallel to each other. Meanwhile, the supporting member 120 is provided in a position such that the portion to be supported 121 is sandwiched from the top and bottom thereof in the vertical direction by the supporting member 120. The pair of supporting members 120 respectively abuts the pair of inclined faces 122*a* of the portion to be supported 121. In other words, the distance between the pair of supporting members 120 is substantially the same as the width of the portion to be supported 121. The supporting member 120 disposed towards the bottom side in the vertical direction supports the portion to be supported 121 from the bottom side in the vertical direction, but the supporting member 120 disposed towards the top side in the vertical direction presses on the portion to be supported 121 from the top side in the vertical direction. As a result, the shifting of the portion to be supported 121 caused by thermal expansion or thermal contraction can be smoothly guided. In addition, each of the pair of inclined faces 122*a* of the portion to be supported 121 is an inclined portion 122. The inclined face 122*a* that forms the inclined portion 122 has a gradient such that the portion to be supported 121 becomes more distant from the LEDs 117 at a protrusion edge position (outer edge position) than at a protrusion base position (inner edge position), and the portion to be supported 121 approaches the LEDs 117 at a position closer to the protrusion base position (inner edge position) than the protrusion edge position (outer edge position). The action of the supporting member 120 and the portion to be supported 121 when the light guide plate 119 thermally expands or thermally contracts is similar to that described in Embodiment 1.

As explained above, according to the present embodiment, the portion to be supported 121 is formed by forming a protrusion in a portion of an edge face (perpendicular face 119*e*) of the light guide plate 119. As a result, the portion to be supported is less likely to block the light transmitted in the light guide plate 119 compared to if the portion to be supported is formed by indenting a portion of an edge face of the light guide plate.

Furthermore, the present embodiment includes the LED substrate 118 formed in a plate shape expanding along the second direction having LEDs 117 mounted thereon and having the connector 118*b* on an edge portion for supplying power to the LEDs 117. In this manner, the portion to be supported 121 is disposed so as to overlap the connector 118*b* in the second direction and the portion to be supported 121 can be provided by using the arrangement space in the second direction of the connector 118*b*. The portion to be supported 121 is disposed in a position that does not overlap the LEDs 117, and thus the portion to be supported 121 is less likely to block light transmitted in the light guide plate 119.

Embodiment 3

Figure 10:
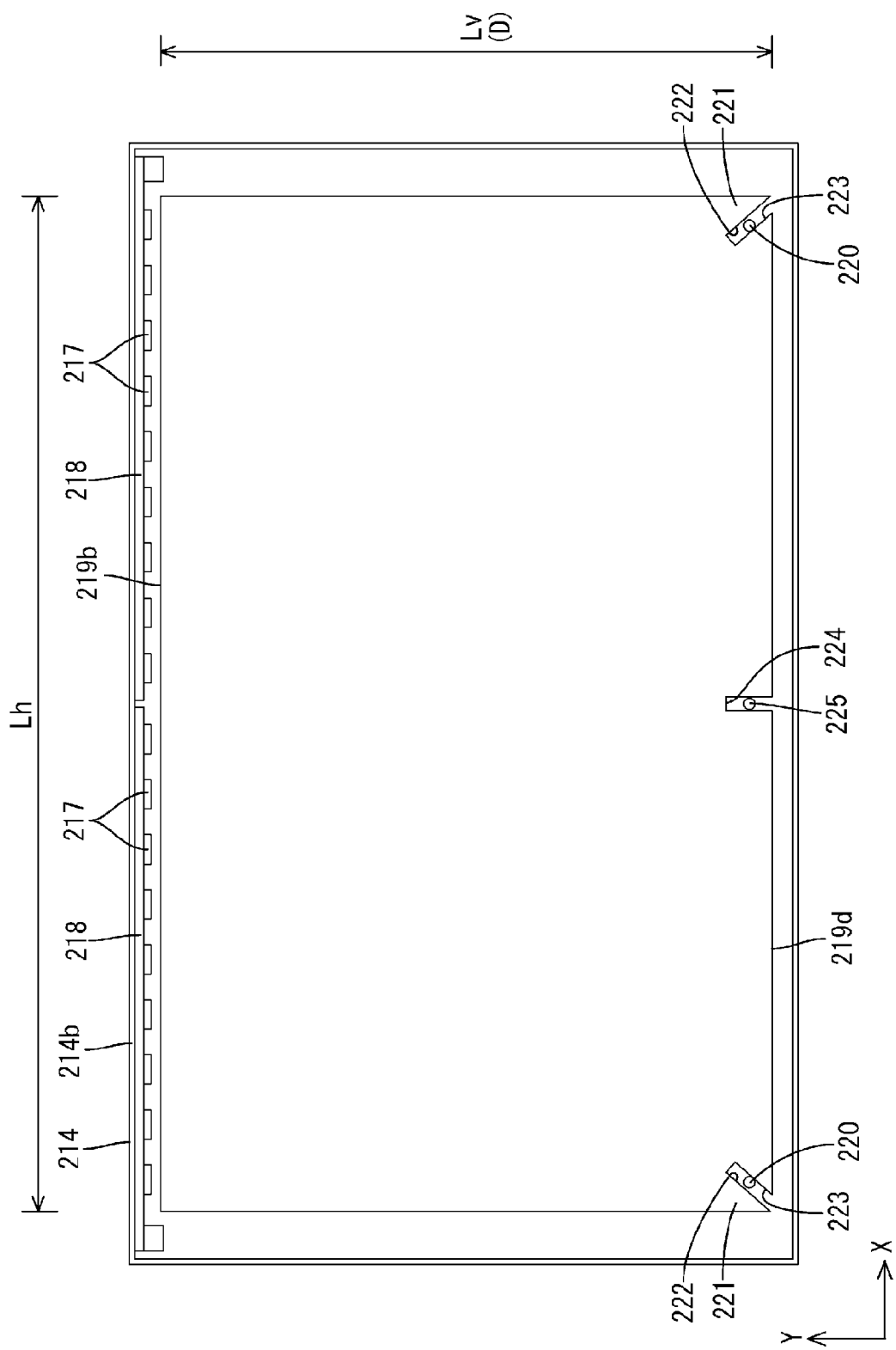
FIG. 10 is a plan view showing an arrangement of a chassis, a light guide plate, and an LED substrate related to Embodiment 3 of the present invention.
Figure 11:
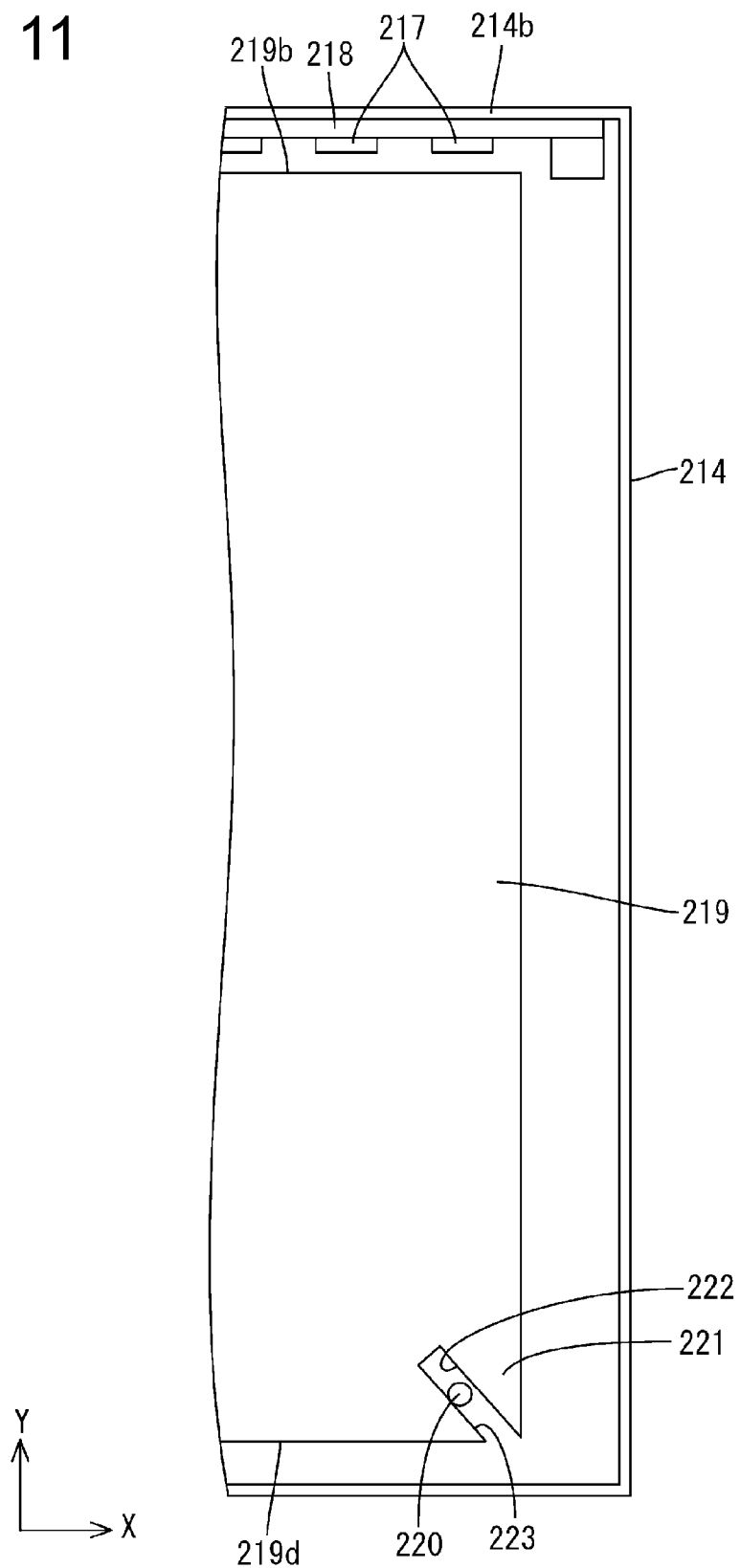
FIG. 11 is a magnified plan view of an edge portion in a horizontal direction of the chassis, the light guide plate, and the LED substrate.

Embodiment 3 of the present invention is described using FIGS. 10 and 11. Embodiment 3 shows a case in which the position of an LED substrate 218, a supporting member 220, a portion to be supported 221, an inclined portion 22, and a groove portion 223 is changed from Embodiment 1. Descriptions of structures, operations, and effects similar to those of Embodiment 1 will be omitted.

As shown in FIGS. 10 and 11, the LED substrate 218 related to the present embodiment is disposed on the top side in the vertical direction relative to the light guide plate 219 and is attached to one of a pair of side plates 214*b* in the long side on the top of the chassis 214. One of a pair of long side edge faces of the light guide plate 219 is a light-receiving face 219*b* on the top side in the vertical direction that faces the LEDs 217, and another of the edge faces is an opposite face 219*d* on the bottom side. The portion to be supported 221 and the groove portion 223 are provided on the opposite face 219*d* side of the light guide plate 219, or in other words, are provided on the respective corner portion on the bottom side in the vertical direction. The supporting member 220 is provided in a vicinity of the respective corner portions on the bottom side in the vertical direction of the chassis 214. The inclined portion 222 provided on the top side (vertical direction) face of the portion to be supported 221 is closer to the bottom side, or in other words, farther away from the LEDs 217, at a position closer to the outer edge than the inner edge, and the inclined portion 222 is closer to the top side, or in other words, closer to the LEDs 217, at a position closer to the inner edge than the outer edge. In this manner, the LED substrate 218, the supporting member 220, the portion to be supported 221, the inclined portion 222, and the groove portion 223 related to the present embodiment are disposed such that the vertical position of these portions is inverted from that of Embodiment 1. The position fixing recess 224 and the position fixing protrusion 225 are also disposed in an inverted position in the vertical direction to that in Embodiment 1.

Even with this type of configuration, the distance between the light-receiving face 219*b* and the LEDs 217 can be maintained at a substantially constant level because the light-receiving face 219*b* shifting towards the LEDs 217 due to the thermal expansion of the light guide plate 219 is cancelled out by the inclined portion 222 guiding the portion to be supported 221 to the bottom side in the vertical direction. In a similar manner, the distance between the light-receiving face 219b and the LEDs 217 remains constant during thermal contraction. The slanted angle "θ" of the inclined portion 222 that can satisfy the condition for the distance between the light-receiving face 219b and the LEDs 217 to be substantially constant can be calculated for the present embodiment in a similar manner to Embodiment 1. Specifically, the distance "D" between the supporting position of the supporting member 220 to the light-receiving face 219b and the horizontal dimension "Lh" of the light guide plate 219 or the vertical dimension "Lv" of the light guide plate 219 should be substituted into formulas (6) to (8).

Embodiment 4

Embodiment 4 of the present invention will be described with reference to FIG. 12. In Embodiment 4, a case in which the position of an LED substrate 318, a portion to be supported 321, and an inclined portion 322 is changed from that in Embodiment 2 is shown. Descriptions of structures, operations, and effects similar to those of Embodiment 2 will be omitted.

Figure 12:
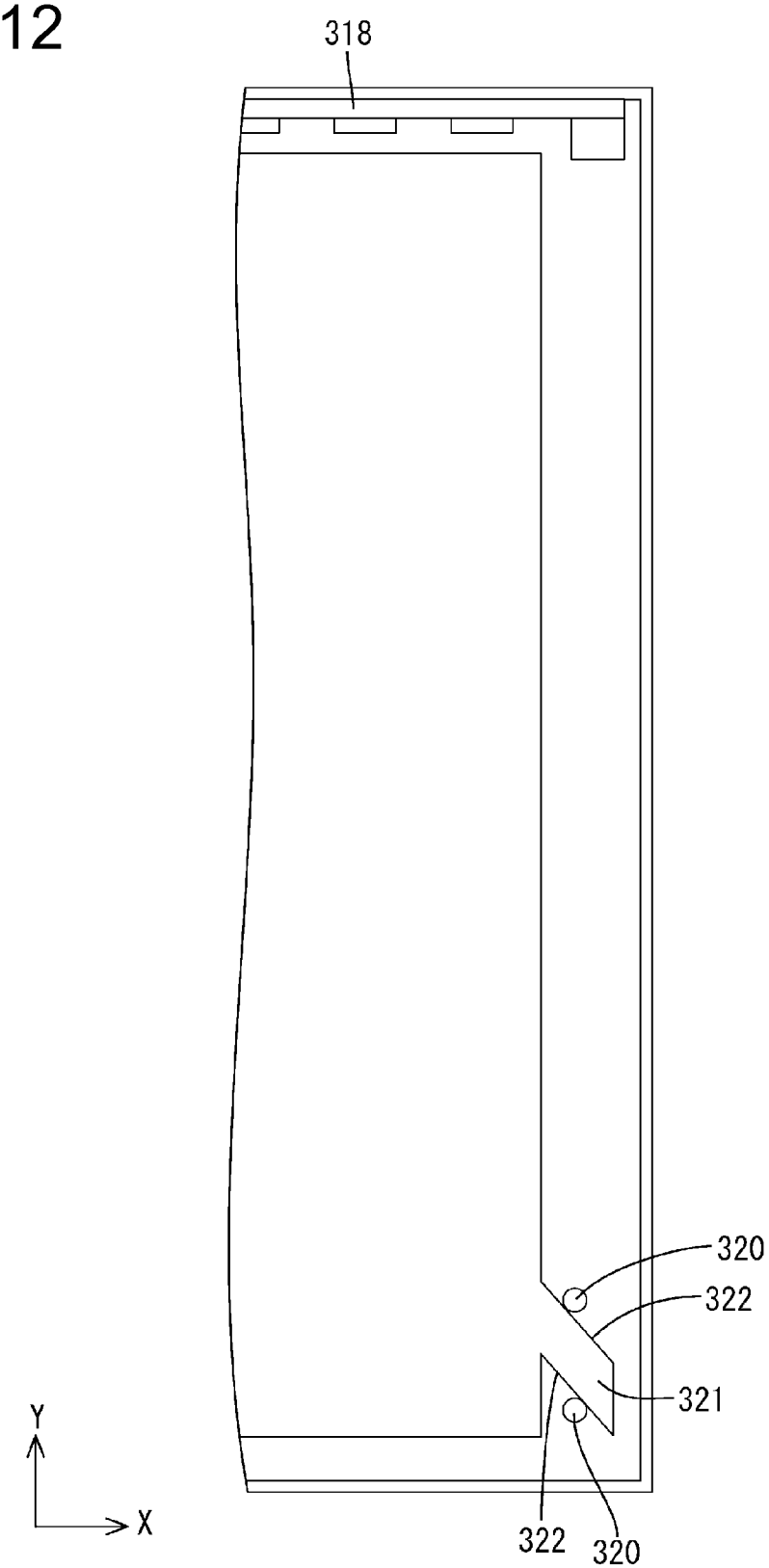
FIG. 12 is a magnified plan view of an edge portion in a horizontal direction of a chassis, a light guide plate, and an LED substrate related to Embodiment 4 of the present invention.

As shown in FIG. 12, the LED substrate 318, the supporting member 320, the portion to be supported 321, and the inclined portion 322 related to the present embodiment are disposed in a vertically inverted position to those described in Embodiment 2. The details regarding the positioning is substantially the same as that described in Embodiment 3.

Embodiment 5

Embodiment 5 of the present invention will be described with reference to FIG. 13. In Embodiment 5, a case in which the size of a light guide plate 419 of Embodiment 1 and the position of a supporting member 420 and a portion to be supported 421 is changed is shown. Descriptions of structures, operations, and effects similar to those of Embodiment 1 will be omitted.

Figure 13:
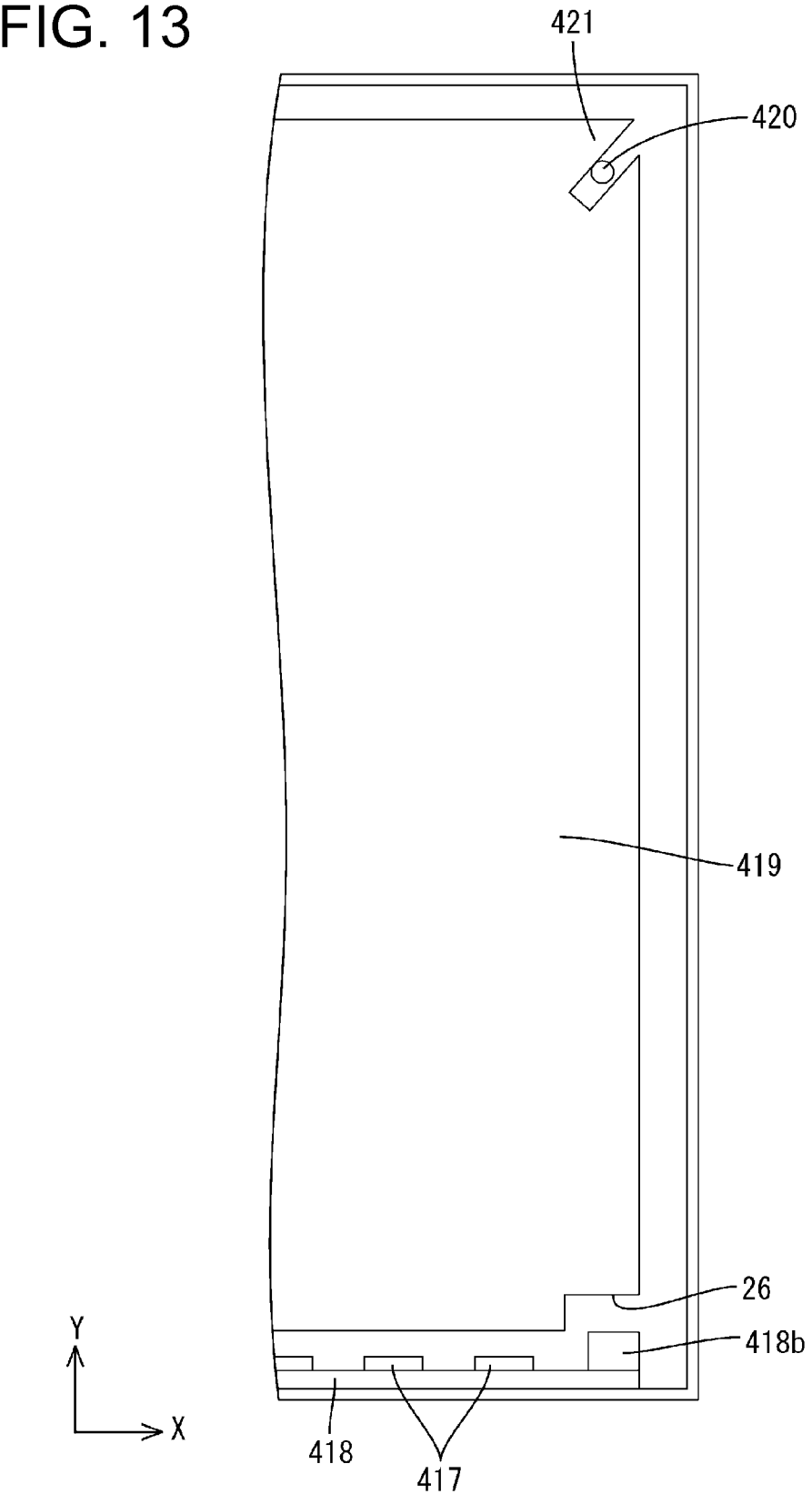
FIG. 13 is a magnified plan view of an edge portion in a horizontal direction of a chassis, a light guide plate, and an LED substrate related to Embodiment 5 of the present invention.

As shown in FIG. 13, the light guide plate 419 related to the present embodiment has a size such that the edge portion of the light guide plate 419 in the horizontal direction overlaps the edge portion of the LED substrate 418. Therefore, a cutout 26 for allowing the connector 418b is formed in a corner portion of the light guide plate 419 in a bottom side (vertical direction) thereof. The portion to be supported 421 and the supporting member 420 provided on the top side of the light guide plate 419 in the vertical direction does not overlap the LEDs 417 on the LED substrate 418 in the horizontal direction, but overlaps the connector 418b. Specifically, the portion to be supported 421 and the supporting member 420 are disposed in a position that is shifted slightly outward in the horizontal direction to the LED substrate 418 closest to the connector 418b With this type of arrangement, the frame portion of the backlight device becomes wider than that disclosed in Embodiment 1 and the portion to be supported 421 and the supporting member 420 is less likely to block light transmitted in the light guide plate 419 and is suitable for suppressing uneven brightness.

Embodiment 6

Embodiment 6 of the present invention will be described with reference to FIG. 14. In Embodiment 6, a case in which an inclined portion 522 and a supporting member 520 is provided is shown. Descriptions of structures, operations, and effects similar to those of Embodiment 1 will be omitted.

Figure 14:
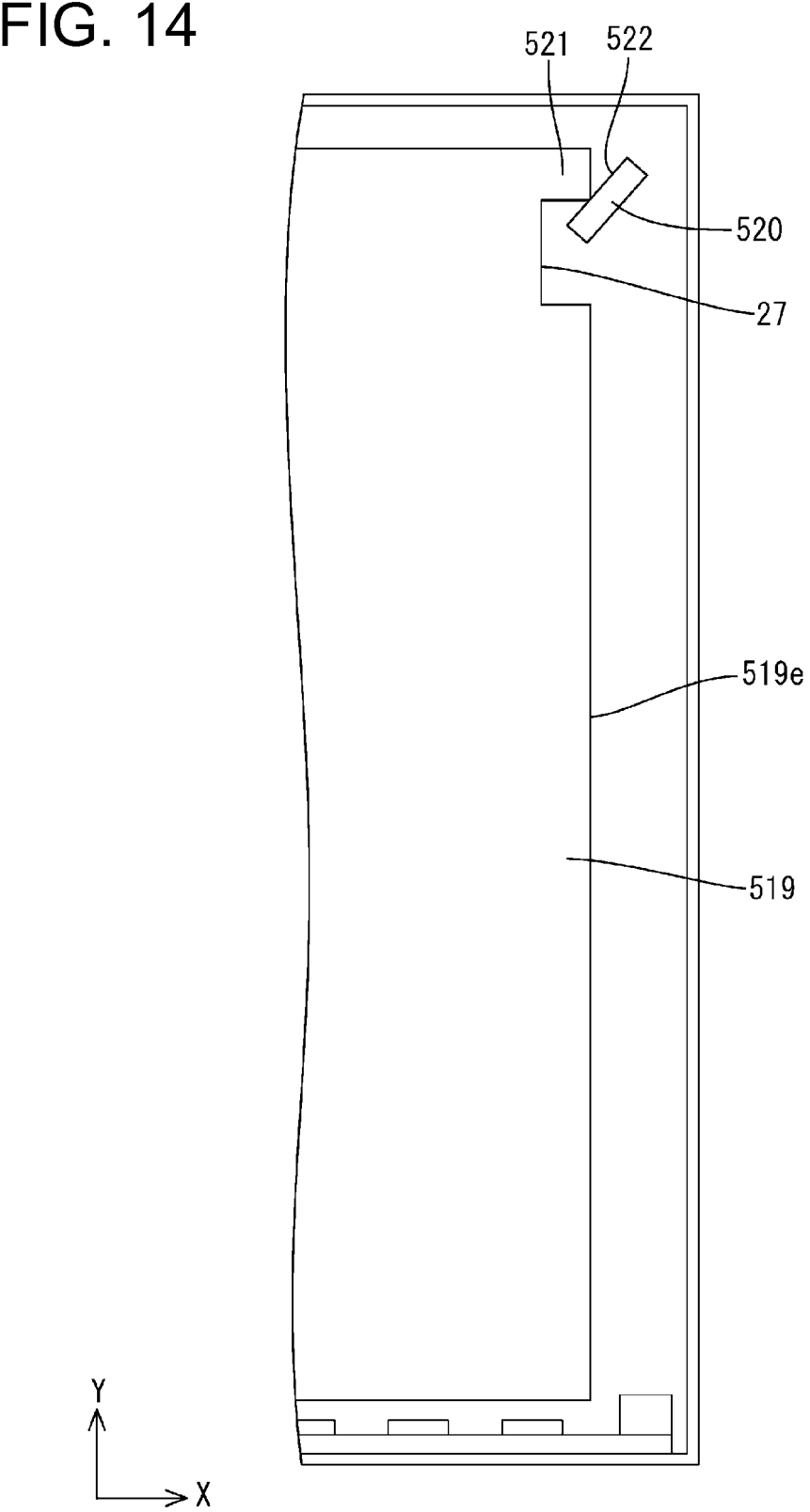
FIG. 14 is a magnified plan view of an edge portion in a horizontal direction of a chassis, a light guide plate, and an LED substrate related to Embodiment 6 of the present invention.

As shown in FIG. 14, the supporting member 520 related to the present embodiment is formed in a substantially block shape that is inclined with respect to both the vertical direction and the horizontal direction in a plan view. The top side surface of the supporting member 520 in the vertical direction is the inclined portion 522. Meanwhile, a cutout 27 is provided in a vertically long rectangular shape in a plan view only in a perpendicular face 519e in a corner portion thereof in the top side (vertical direction) of the light guide plate 519. The remaining portion of the light guide plate 519 on top of the cutout 27 is a portion to be supported 521. The portion to be supported 521 has a rectangular shape in a plan view, and the corner edge portion in the bottom side (vertical direction) abuts the inclined portion 522 of the supporting member 520. The cutout 27 is configured to accommodate the supporting member 520 if the light guide plate 519 thermally expands. Even with such a configuration, operations and effects similar to those of Embodiment 1 can be attained.

Embodiment 7

Embodiment 7 of the present invention will be described with reference to FIG. 15. Embodiment 6 shows a case in which the form of the holes 529 is different from that of Embodiment 5. Descriptions of structures, operations, and effects similar to those of Embodiment 6 will be omitted.

Figure 15:
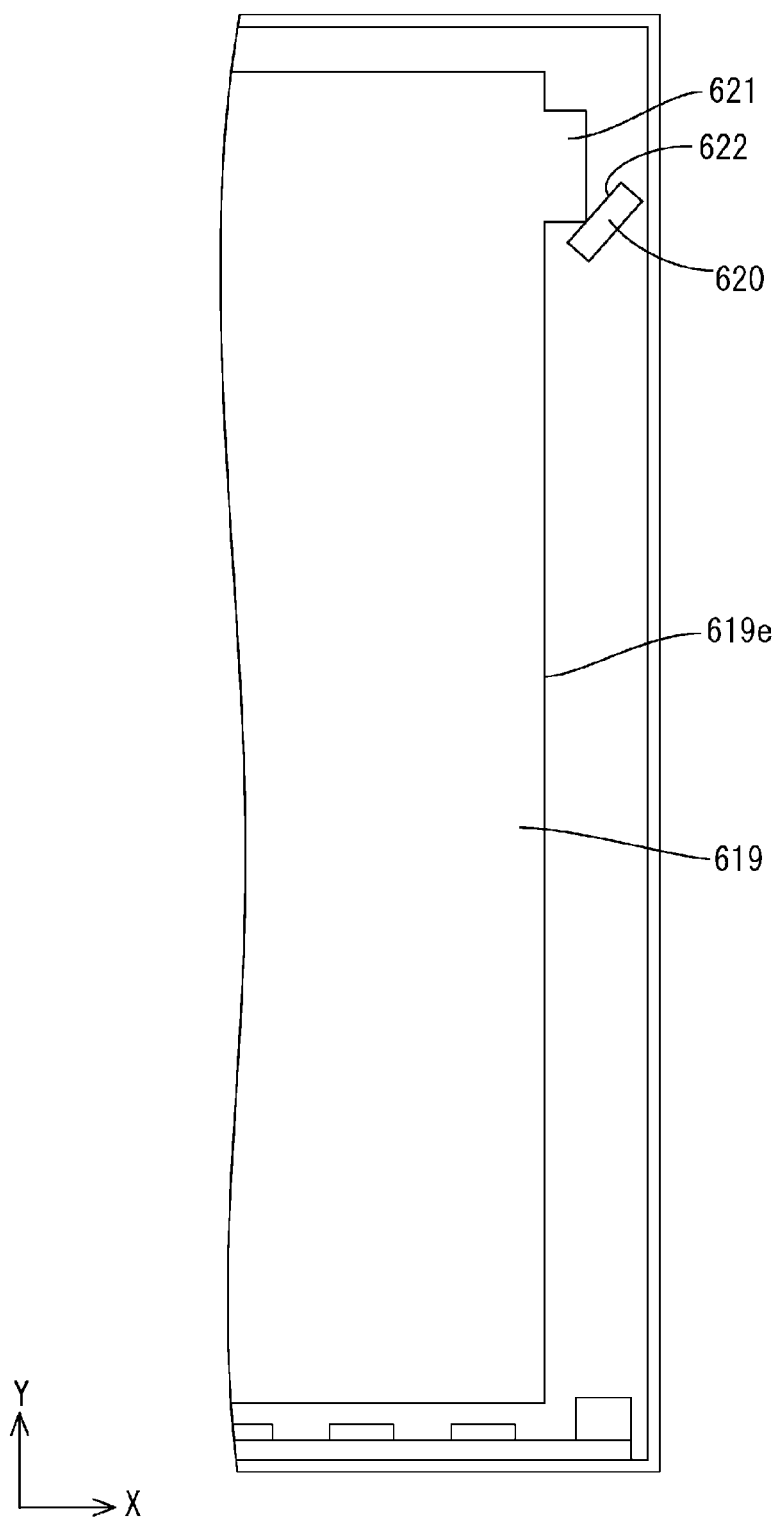
FIG. 15 is a magnified plan view of an edge portion in a horizontal direction of a chassis, a light guide plate, and an LED substrate related to Embodiment 7 of the present invention.

As shown in FIG. 15, the portion to be supported 621 related to the present embodiment is formed by forming a protrusion in a portion of the perpendicular face 619e of the light guide plate 619. The portion to be supported 621 has a vertically long rectangular shape in a plan view, and protrudes outward along the horizontal direction from the perpendicular face 619e in the corner portion in the top side in the vertical direction. The corner edge portion in the bottom side of the portion to be supported 621 in the vertical direction abuts the inclined portion 622 of the supporting member 620.

Embodiment 8

Embodiment 8 of the present invention will be described with reference to FIGS. 16 to 18. In Embodiment 8, a case in which the cabinet is omitted from the television receiver TV in Embodiment 1 is shown. Descriptions of structures, operations, and effects similar to those of Embodiment 1 will be omitted.

Figure 16:
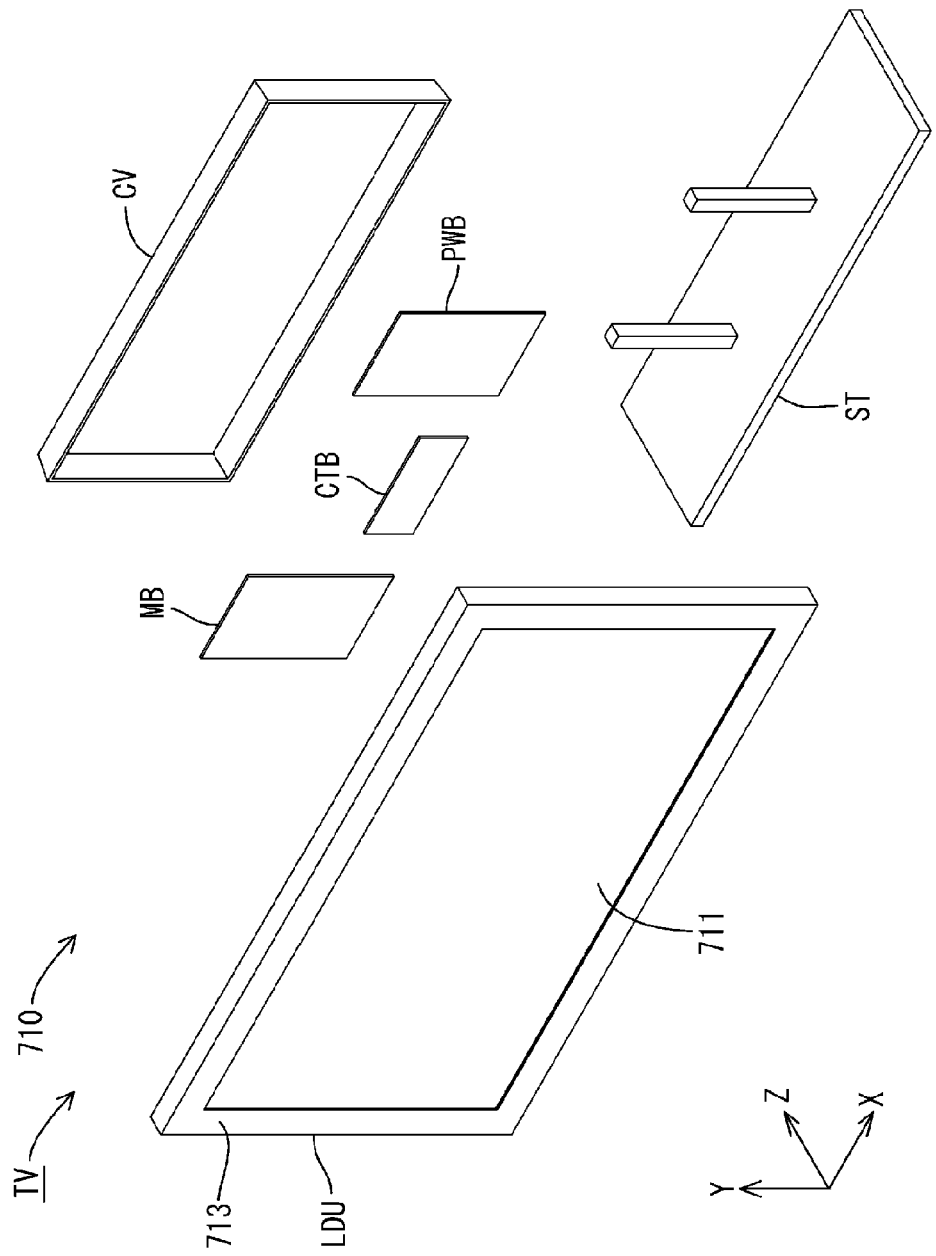
FIG. 16 is an exploded perspective view that shows a schematic configuration of a television receiver according to Embodiment 8 of the present invention.

As shown in FIG. 16, a television receiver TV according to the present embodiment has a liquid crystal display unit (display unit) LDU, various boards PWB, MB, and CTB attached to the rear side (back side) of the liquid crystal display unit LDU, a cover member CV that is attached to the rear side of the liquid crystal display unit LDU and covers the various boards PWB, MB, and CTB, and a stand ST. The television receiver TV is supported by the stand ST in a state in which the display surface of the liquid crystal unit LDU coincides with the vertical direction (Y axis direction). The liquid crystal display device 710 of the present embodiment is the television receiver TV having the above-mentioned configuration but excluding at least the structure for receiving television signals (such as a tuner part of a main board MB). As shown in FIG. 17, the liquid crystal display unit LDU has a horizontally-long quadrilateral shape (rectangular) as a whole, and includes a liquid crystal panel 711, and a backlight device 712. These are integrally held together by a frame 713 and a chassis 714, which are external members that constitute the exterior of the liquid crystal display device 710. The chassis 714 of the present embodiment constitutes one of the exterior members and is also a part of the backlight device 712.

Figure 17:
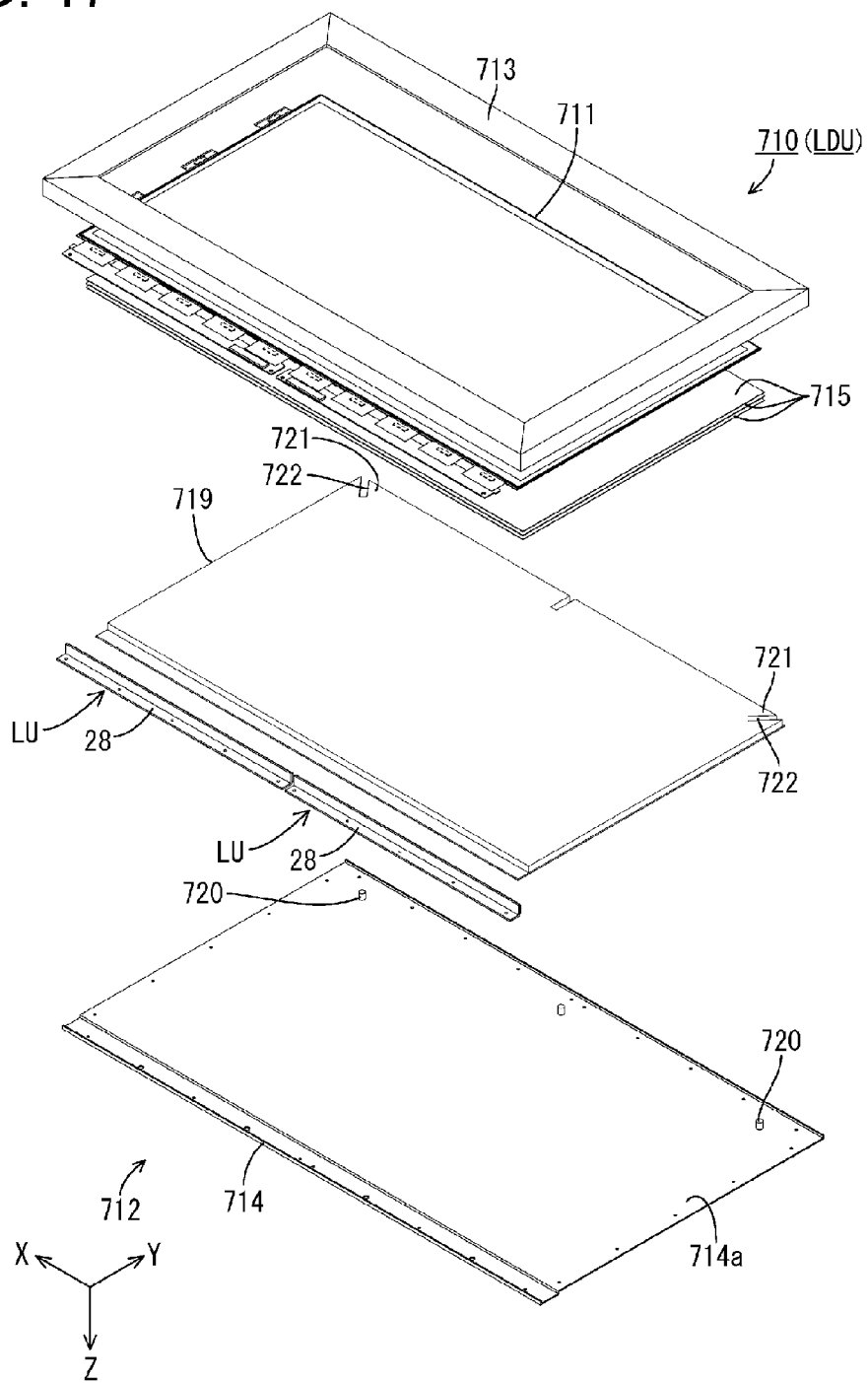
FIG. 17 is an exploded perspective view showing a schematic configuration of a liquid crystal display unit that constitutes a part of the liquid crystal display device.
Figure 18:
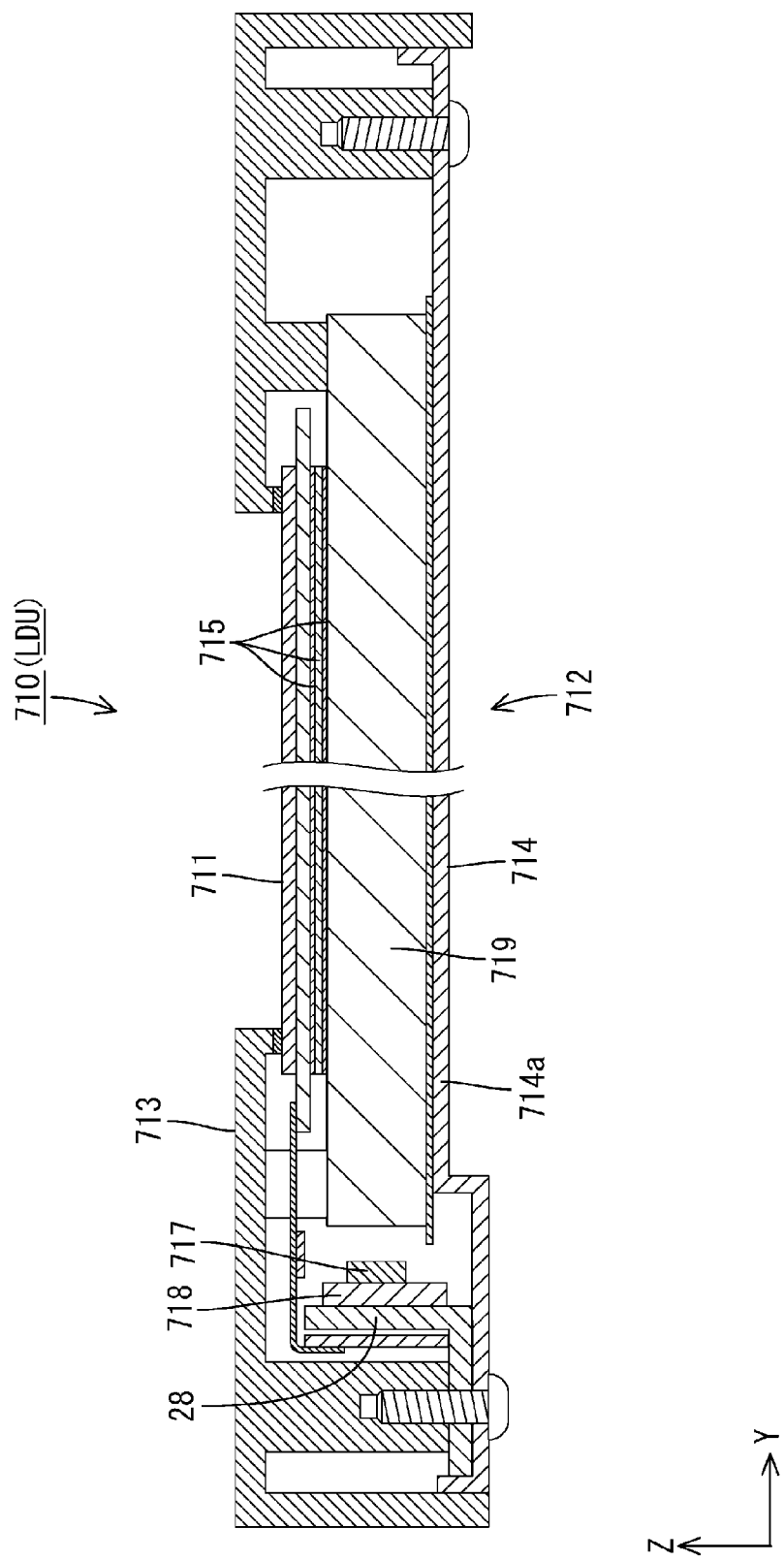
FIG. 18 is a cross-sectional view of a configuration of a liquid crystal display device along the shorter side direction.

As shown in FIGS. 17 and 18, the main constituting components of the liquid crystal display unit LDU, which forms a portion of the liquid crystal display device 710, are housed in a space between the bezel (front frame) 713 that constitutes the front exterior of the liquid crystal display device 710, and the chassis (rear chassis) 714 that constitutes the rear exterior. The main constituting components housed between the frame 713 and the chassis 714 include at least the liquid crystal panel 711, optical members 715, a light guide plate 719, and LED units (light source units) LU. Among these, the liquid crystal pane 711, the optical members 715 and the light guide plate 719 are sandwiched and held by the bezel 713 on the front side and the chassis 714 on the rear side. Therefore, the frame 16 (see FIGS. 2 and 4) interposed between the liquid crystal panel 11 and the optical member 11 described in Embodiment 1 is omitted in the liquid crystal display device 710 related to the present embodiment As shown in FIGS. 17 and 18, the backlight device 712 is formed of the optical members 715, the light guide plate 719, the LED unit LU, and the chassis 714, and has a configuration in which the liquid crystal panel 711 and the bezel 713 are excluded from the liquid crystal display unit LDU mentioned above. The pair of LED units LU forming the backlight device 712 is aligned along the horizontal direction (X axis direction) below the light guide plate 719 in the vertical direction (Y axis direction) within the bezel 713 and the chassis 714. The LED unit LU is formed of LEDs 717, an LED substrate 718 where the LEDs 717 are mounted, and a heat-dissipating member (heat spreader, light source attaching member) 28. As shown in FIG. 17, in the vicinity of each of the corner portions on the top side in the vertical direction of the bottom plate 714a of the chassis 714, a pair of supporting members 720 is provided so as to rise towards the front side, and a pair of portions to be supported 721 that is supported by the supporting member 720 from the bottom side in the vertical direction is respectively provided on the corner portions on the top side of the light guide plate 719 in the vertical direction. An inclined portion 722 that is inclined to both the vertical direction and the horizontal direction is provided on the portion to be supported 721. The inclination angle of the inclined portion 722 is similar to that in Embodiment 1 mentioned above.

Other Embodiments

The present invention is not limited to the embodiments shown in the drawings and described above, and the following embodiments are also included in the technical scope of the present invention, for example.

(1) In Embodiments 1, 3, 5, and 8, cases in which the width of the groove portion is greater than the outer diameter of the supporting member is shown, but it is also possible to have the width of the groove portion be substantially the same as the outer diameter of the supporting member and that the supporting member be in sliding contact with the pair of inclined faces of the groove portion.

(2) In Embodiments, 1, 3, 5, and 8, a case in which the groove portion has an opening in the corner position (both opposite face and perpendicular face of the light guide plate) was shown, but the groove portion can have an opening only in the opposite face of the light guide plate, or have an opening only in the perpendicular face of the light guide plate.

(3) In Embodiments 1, 3, 5, and 8, a case in which the width of the groove portion is constant for the entire length was shown, but it is possible to gradually make the width of the groove portion smaller towards the open end side from the inner end side or make the width of the groove portion gradually larger towards the open end side from the inner end side. In this case, it is preferable that among the pair of inclined faces of the groove portion, the one on the bottom side, or in other words, the inclined face on the opposite side to the inclined face forming the inclined portion have a different inclination angle to the inclination angle of the inclined face forming the inclined portion.

(4) In Embodiments 2 and 4, a case in which the portion to be supported protrudes from the perpendicular face of the light guide plate has been shown, but it is possible to have an embodiment with a portion to be supported protruding from an opposite face of the light guide plate or an embodiment with a portion to be supported protruding from a corner position (both opposite face and perpendicular face of the light guide plate).

(5) In Embodiments 2 and 4, a case in which the pair of supporting members sandwich the portion to be supported from the top and bottom in the vertical direction was shown, but it is also possible to omit the supporting member provided on the top side of the portion to be supported in the vertical direction.

(6) In Embodiments 2 and 4, a case in which the width of the portion to be supported is the same along the entire length was shown, but it is possible to gradually make the width of the portion to be supported smaller towards the protrusion edge side from the protrusion base side or make the width of the groove portion gradually larger towards the protrusion edge side from the protrusion base side. In this case, it is preferable that among the pair of slanted faces of the portion to be supported, the one on the bottom side, or in other words, the slanted face on the opposite side to the slanted face forming the inclined portion have a different inclination angle to the inclination angle of the slanted face forming the inclined portion.

(7) In Embodiment 5, the portion to be supported does not overlap the LED in the horizontal direction, but overlaps the connector as shown, but it is possible to dispose the portion to be supported to overlap both the LED and the connector.

(8) In the respective embodiments, cases in which the slanted faces are formed in a straight shape is shown, but configurations in which the inclined portion is formed in a circular shape face and a non-circular curved shape face is also included in the present invention.

(9) The respective embodiments mentioned above showed examples having an inclined portion with an inclination angle "θ" of approximately 48 degrees and satisfies the condition that the distance between the light-receiving face and the LED is substantially constant, but in the respective embodiments mentioned above, the inclination angle "θ" of the inclined portion can be a value that satisfies the Formula (9) or (10) for which the distance between the light-receiving face and the LED can be slightly changed.

(10) Other than the respective embodiments mentioned above, the ratio of the horizontal dimension and the vertical dimension of the light guide plate can be changed as appropriate. If the inclination angle "θ" of the inclined portion will be changed as well, then the value should satisfy one of the formulas (4) to (10).

(11) Other than the respective embodiments, the position of the portion to be supported and the inclined portion in the horizontal direction and the vertical direction can be changed. In this case, the inclination angle "θ" of the inclined portion can be changed as appropriate. If the inclination angle "θ" of the inclined portion will be changed, then the value should satisfy one of the formulas (4) to (10).

(12) In the respective embodiments, cases in which the inclination angle "θ" of the inclined portion satisfies one of the formulas (4) to (10) are shown, but the present invention also includes cases in which the inclination angle "θ" of the inclined portion does not satisfy any of the formulas (4) to (10) as well.

(13) In the respective embodiments above, cases in which the portions to be supported, the supporting members, and the inclined portions are disposed in symmetry on the light guide plate are shown, but the portions to be supported, the supporting members, and the inclined portions can be disposed in asymmetry on the light guide plate. In this case, the inclination angle of one of the inclined portion can be different from the inclination angle of another inclined portion.

(14) In the respective embodiments (excluding Embodiments 6 and 7), a case in which the supporting member is formed in a prism shape formed in a columnar shape is shown, but the specific shape can be changed as appropriate. The supporting member can be made in an elliptic cylinder shape having an oval shape in a plan view, in a prism shape having a right triangle shape or other triangular shapes in a plan view, or in a prism shape having a square shape or a rhombus shape in a plan view.

(15) In the respective embodiments above, cases in which the chassis and the supporting member are integrally formed were shown, but a case in which the supporting member is a separate part attached to the chassis is included in the present invention.

(16) In the respective embodiments above, configurations in which thermal expansion and the thermal contraction of the light guide plate in both the left and right side in the horizontal direction being accommodated were shown. but a case in which the position fixing recess and the position fixing protrusion is omitted and the expansion and contraction in only either the left or right side is accommodated can be applied to the present invention. In this case, the general formula for calculating the inclination angle "θ" is the formulas (4) to (10) with respective right sides of the being multiplied by "½." In this case, it is preferable that the portion to be supported, the supporting member, and the inclined portion be provided on only one corner portion in the horizontal direction of the light guide plate.

(17) In the respective embodiments above, a case in which a portion to be supported is provided on the light guide plate is shown, but the portion to be supported that is supported by the supporting member can also be provided on the optical member. In this case, an inclined portion can be provided on the portion to be supported of the optical member.

(18) In the respective embodiments, a case in which the portion to be supported is integrally formed with the light guide plate is shown, but a case in which the portion to be supported is a separate part from the light guide plate attached thereto to be joined is included in the present invention.

(19) In the respective embodiments above, two LED substrates were disposed at one side of the light guide plate, but one LED substrate or three or more LED substrates may be disposed at one side of the light guide plate.

(20) In the respective embodiments above, the colored portions of the color filters provided in the liquid crystal panel included the three colors of R, G, and B, but it is possible to have the colored portions include four or more colors.

(21) In the respective embodiments above, LEDs were used as the light source, but other types of light source such as an organic EL element may also be used.

(22) In the respective embodiments above, TFTs are used as the switching element in the liquid crystal display device, but the present invention can be applied to a liquid crystal display device that uses a switching element other than a TFT (a thin film diode (TFD), for example), and, besides a color liquid crystal display device, the present invention can also be applied to a black and white liquid crystal display device.

(23) In the respective embodiments above, a liquid crystal display device using a liquid crystal panel as a display panel was described as an example, but the present invention can be applied to a display device that uses another type of display panel.

(24) In the respective embodiments above, a television receiver that includes a tuner was illustratively shown, but the present invention is also applicable to a display device without a tuner. Specifically, the present invention may also be applied to digital signage and electronic black boards.

(25) In the respective embodiments above, cases in which the optical members are formed of three sheet-shaped members were shown, but the number of optical members can be changed from three (two or less, or four or more) as appropriate. The type of optical members to be used can also be changed as appropriate, and a plurality of the same type of optical members can be used as well.

(26) In the respective embodiments mentioned above, a case in which a sheet member is attached to the frame to press on the light guide plate and prevent light leakage was shown, but this type of sheet member can be removed. In addition, scattering of light can be suppressed by forming the frame using a resin material with a white surface and using a sheet member with a black surface instead of the sheet member mentioned above. Otherwise, a reflective sheet having excellent light reflective properties can be attached instead of the sheet member mentioned above.

DESCRIPTION OF REFERENCE CHARACTERS 10, 710 liquid crystal display device (display device)
11, 711 liquid crystal panel (display panel)
12, 712 backlight device (illumination device)
14, 114, 414, 714 chassis
14A, 714A bottom plate
17, 117, 217, 417, 717 LED (light source)
18 LED substrate (light source substrate)
18b connector (power supply member)
19, 119, 219, 419, 619, 719 light guide plate
19a light-emitting surface
19b, 219b, 719b light-receiving face
19d, 219d opposite surface
19e, 119e, 519e, 619e perpendicular face (edge face)
20, 120, 220, 320, 420, 520, 620, 720 supporting portion
21, 121, 221, 321, 421, 521, 621, 721 portion to be supported
22, 122, 222, 322, 422, 622, 722 inclined portion
22a, 122a inclined face
TV television receiver

What is claimed is:
1. An illumination device, comprising:
a light source;
a light guide plate having a rectangular shape including a light-receiving side face facing the light source, said light guide plate further having a surface that is a light-emitting surface that emits light and a portion to be supported that is provided at a corner area of the light guide plate on a side of the light guide plate opposite the light-receiving side face; and
a supporting member that supports the light guide plate in a first direction and a second direction by abutting the light guide plate at the portion to be supported, said second direction being a direction parallel to the light- receiving side face of the light guide plate, said first direction being a direction perpendicular to the second direction in a plan view, wherein at least one of the portion to be supported and the supporting member has a structure extending in a direction that is angled relative to the first direction and the second direction, the structure extending generally outwardly relative to a center of the light guide plate and wherein the inclined portion is formed of an inclined face that is linear.

2. The illumination device according to claim 1, wherein the portion to be supported is formed by indenting a portion of a side face of the light guide plate.

3. The illumination device according to claim 2, wherein the portion to be supported is provided in a position that overlaps the light source in the second direction.

4. The illumination device according to claim 2, further comprising:
   a light source substrate formed in a plate shape extending along the second direction, said light source substrate having a power supply member for supplying power to the light source on an end portion in the second direction,
   wherein the power supply member does not overlap the light guide plate in the second direction.

5. The illumination device according to claim 1, wherein the portion to be supported, the supporting member, and the inclined portion are provided on each of opposing sides of the light guide plate that are opposing each other in the second direction.

6. The illumination device according to claim 1,
   wherein, when the illumination device is placed such that the first direction substantially matches a vertical direction and the second direction substantially matches a horizontal direction, the supporting member and the portion to be supported of the light guide plate are configured such that the supporting member supports the light guide plate from below.

7. The illumination device according to claim 1, wherein at least the portion to be supported of the light guide plate has the inclined portion.

8. The illumination device according to claim 1, further comprising:
   a chassis that houses the light source and the light guide plate, said chassis having a bottom plate disposed behind the light guide plate on a rear side of the illumination device,
   wherein the supporting member is provided by raising a portion of the bottom plate towards a front side of the illumination device.

9. The illumination device according to claim 1, wherein the portion to be supported is provided by forming a protrusion on a portion of a side face of the light guide plate.

10. The illumination device according to claim 1, further comprising:
    a light source substrate formed in a plate shape extending along the second direction, said light source substrate having a power supply member for supplying power to the light source on an end portion in the second direction,
    wherein the portion to be supported of the light guide plate is disposed so as to overlap the power supply member but not overlap the light source in the second direction.

11. A display device comprising the illumination device according to claim 1, and a display panel that performs display using light from the illumination device.

12. The display device according to claim 11, wherein the display panel is a liquid crystal panel including a pair of substrates with liquid crystal sealed therebetween.

13. A television receiver, comprising the display device according to claim 11.

* * * * *